United States Patent
Patel et al.

(10) Patent No.: US 11,130,900 B2
(45) Date of Patent: Sep. 28, 2021

(54) METHOD FOR IMPROVING CEMENT TOUGHNESS

(71) Applicant: Saudi Arabian Oil Company, Dhahran (SA)

(72) Inventors: Hasmukh A. Patel, Houston, TX (US); Carl Thaemlitz, Cypress, TX (US)

(73) Assignee: Saudi Arabian Oil Company, Dhahran (SA)

(*) Notice: Subject to any disclaimer, the term of this patent is extended or adjusted under 35 U.S.C. 154(b) by 0 days.

(21) Appl. No.: 17/069,631

(22) Filed: Oct. 13, 2020

(65) Prior Publication Data

US 2021/0024806 A1  Jan. 28, 2021

Related U.S. Application Data

(62) Division of application No. 16/397,579, filed on Apr. 29, 2019, now Pat. No. 10,836,950.

(51) Int. Cl.
| | |
|---|---|
| C09K 8/467 | (2006.01) |
| C04B 24/28 | (2006.01) |
| E21B 33/14 | (2006.01) |
| C04B 111/34 | (2006.01) |

(52) U.S. Cl.
CPC ............ *C09K 8/467* (2013.01); *C04B 24/28* (2013.01); *E21B 33/14* (2013.01); *C04B 2111/343* (2013.01); *C04B 2201/50* (2013.01)

(58) Field of Classification Search
None
See application file for complete search history.

(56) References Cited

U.S. PATENT DOCUMENTS

| | | | |
|---|---|---|---|
| 3,301,797 A | 1/1967 | Drucket et al. | |
| 3,481,903 A | 12/1969 | Alelio | |
| 4,272,430 A | 6/1981 | Pieh et al. | |
| 4,771,112 A | 9/1988 | Engelbrecht | |
| 4,797,433 A | 1/1989 | Lahalih | |
| 5,062,897 A * | 11/1991 | Katsumata | C04B 28/02 106/696 |
| 5,352,290 A | 10/1994 | Takeshita et al. | |
| 5,891,983 A | 4/1999 | Albrecht | |
| 2006/0048671 A1* | 3/2006 | Ong | C04B 28/14 106/15.05 |
| 2012/0322695 A1 | 12/2012 | Kefi et al. | |

(Continued)

FOREIGN PATENT DOCUMENTS

| | | |
|---|---|---|
| EP | 0383348 | 8/1990 |
| JP | H 10158045 | 6/1998 |
| WO | WO 2016080674 | 5/2016 |

OTHER PUBLICATIONS

PCT International Search Report and Written Opinion issued in International Application No. PCT/US2020/030289 dated Aug. 20, 2020, 12 pages.

*Primary Examiner* — John J Figueroa
(74) *Attorney, Agent, or Firm* — Fish & Richardson P.C.

(57) ABSTRACT

This document relates to methods for providing long-term zonal isolation in oil wells using cement compositions that contain triazine-based polymeric additives. The cement compositions containing the polymeric additives exhibit increased tensile strength, elastic strength, or both, without suffering a decrease in compressive strength, as compared to the same cement without the polymeric additive.

29 Claims, 4 Drawing Sheets

(56) References Cited

U.S. PATENT DOCUMENTS

| | | |
|---|---|---|
| 2015/0198008 A1 | 7/2015 | Smith et al. |
| 2016/0177655 A1 | 6/2016 | Fripp |
| 2017/0218248 A1 | 8/2017 | Boni et al. |
| 2017/0369761 A1 | 12/2017 | Jones et al. |
| 2018/0215988 A1 | 8/2018 | Gamwell et al. |

* cited by examiner

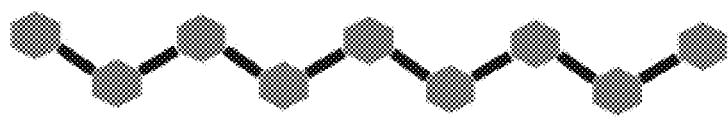
FIG. 1A
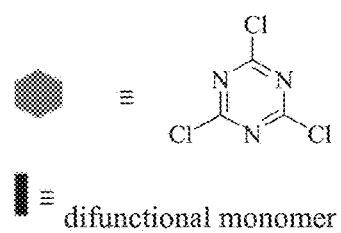
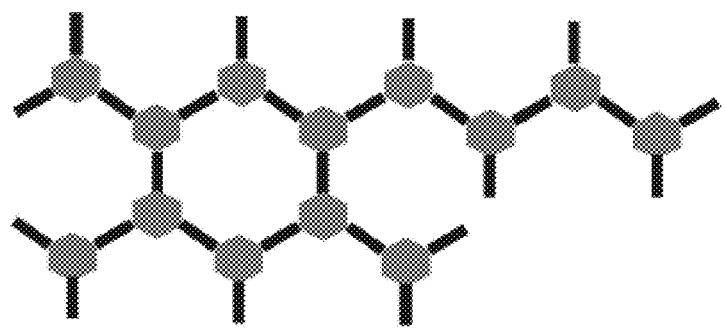
FIG. 1B

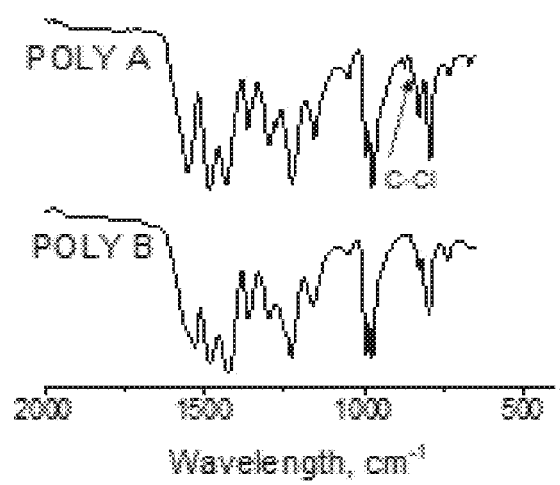
FIG. 2
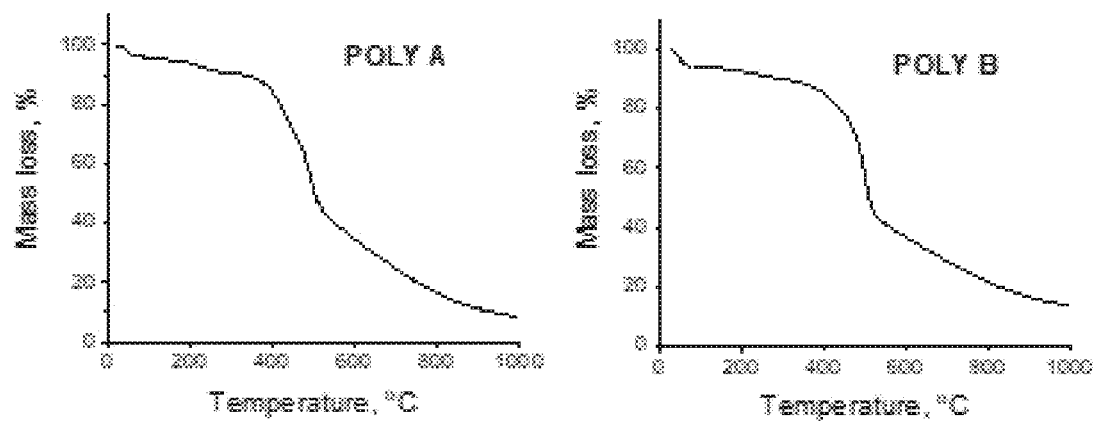
FIG. 3A                    FIG. 3B

METHOD FOR IMPROVING CEMENT TOUGHNESS

CROSS-REFERENCE TO RELATED APPLICATIONS

This application is a divisional of and claims the benefit of U.S. application Ser. No. 16/397,579 filed on Apr. 29, 2019, the entire contents of which are incorporated by reference in its entirety.

TECHNICAL FIELD

This disclosure describes improvements to wellbore cements and methods for using such improved wellbore cements.

BACKGROUND

Well cementing is an important operation during drilling and completion of oil wells. The cement sheath must maintain well integrity behind the casing and provide long-term zonal isolation to ensure safety and prevent environmental problems. The cement placed in the annulus between the casing and the formation experiences frequent stresses, such as varying or extreme temperatures and pressures. These frequent stresses can deteriorate the mechanical properties of the cement over a period of time and lead to formation of micro-cracks and fractures, thus affecting the production and increasing the cost of operation.

Since cement tends to fracture under downhole conditions due to the brittleness of the cement in its neat form, polymeric additives, including polymeric and organic-inorganic hybrid material-based additives, have been added to the cement in an attempt to improve the elastic properties. Generally, the polymeric additives bind cement particles through weak physical bonding, for example, electrostatic or hydrogen bonding. While these additives have substantially improved the tensile properties of the cement, such additives tend to impart a significantly negative attribute to the cement in the form of a reduction in compressive strength.

Therefore, there is a need for additives and methods that improve the tensile properties of cement, while having a minimum impact on the compressive strength, for adequate long-term zonal isolation in oil wells.

SUMMARY

Provided in this disclosure are polymeric additives, cement compositions, and methods for treating subterranean formations. The cement compositions containing the polymeric additives exhibit increased tensile strength, elastic strength, or both, without suffering a decrease in compressive strength, as compared to the same cement without the polymeric additive. Also provided are methods of using such cement compositions in the long-term zonal isolation of oil wells.

Provided in this disclosure is a method for preventing the formation of micro-cracks and fractures in the cement of an oil well, thereby providing long-term zonal isolation in the well, the method including providing to an oil well a cement composition that contains cement and a triazine polymeric additive selected from a polymer with repeat unit A and a polymer with repeat unit B:

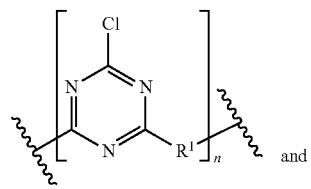

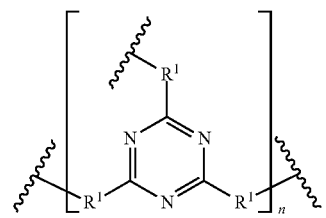

where $R^1$ is selected from the group consisting of a cyclic aliphatic secondary amine, an aromatic diamine, an aromatic diol, an aliphatic diamine, and an aliphatic diol; and n is about 10 to about 1000, about 50 to about 500, or about 100 to about 200; where the cement composition exhibits improved elastic properties as compared to the same composition without the polymeric additive.

In some embodiments of the method, $R^1$ is selected from the group consisting of:

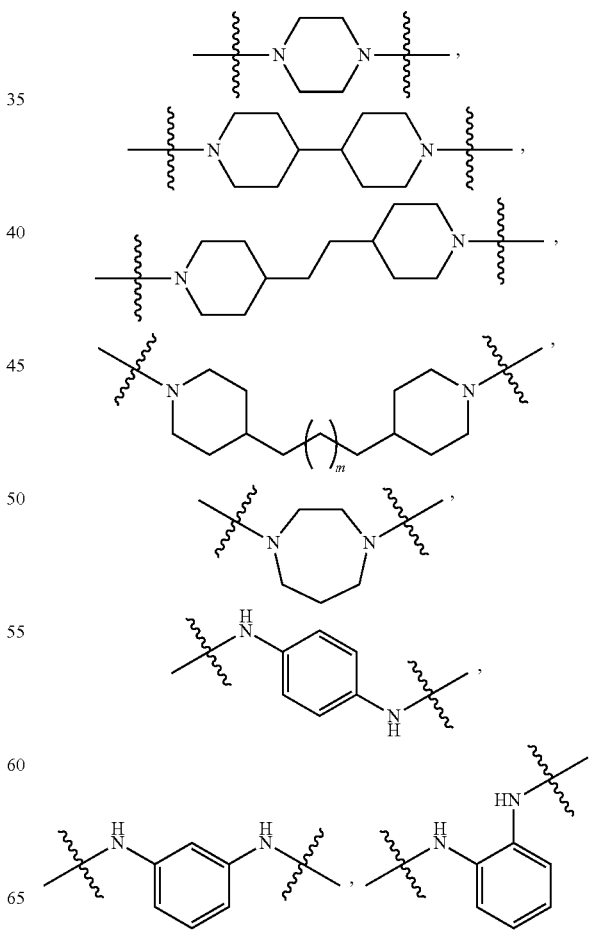

-continued

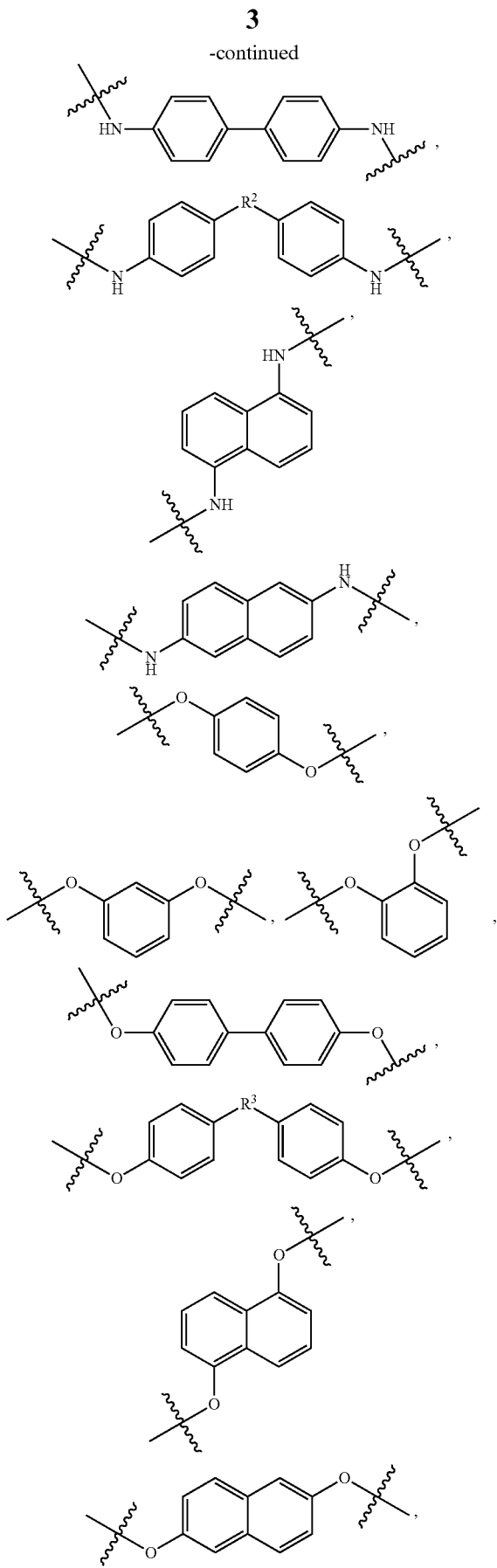

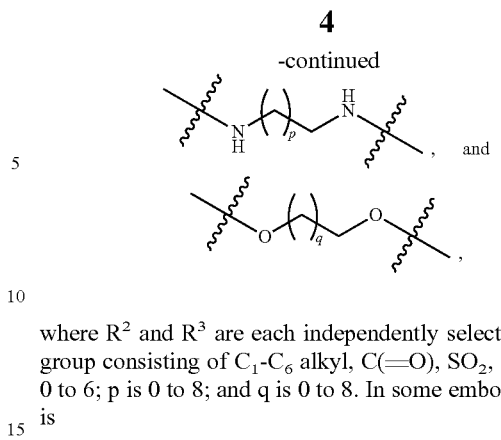

where $R^2$ and $R^3$ are each independently selected from the group consisting of $C_1$-$C_6$ alkyl, $C(=O)$, $SO_2$, and O; m is 0 to 6; p is 0 to 8; and q is 0 to 8. In some embodiments, $R^1$ is

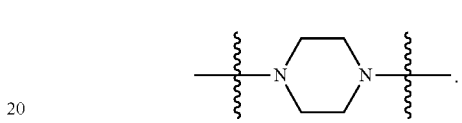

In some embodiments of the method, the polymeric additive is a polymer with repeat unit A and has the structure:

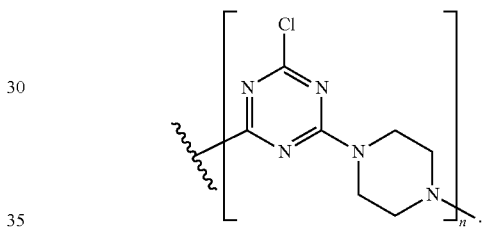

In some embodiments of the method, the polymeric additive is a polymer with repeat unit B and has the structure:

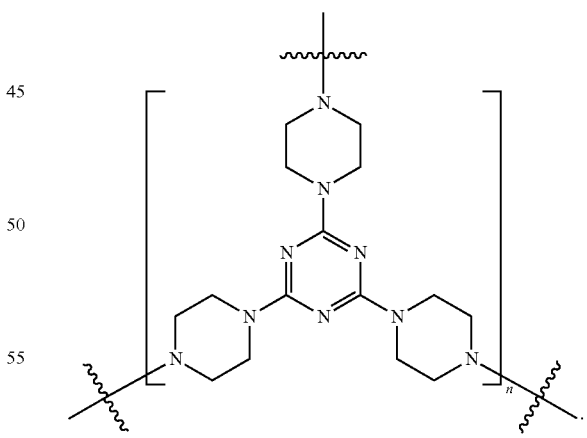

In some embodiments of the method, the amount of polymeric additive in the cement composition is between about 0.1% to about 10% by weight of the cement. In some embodiments, the amount of polymeric additive in the cement composition is about 3% by weight of the cement.

In some embodiments of the method, the cement composition also contains one or more of a suspending agent, a neutralizing agent, and a reaction propagating agent. In some embodiments, the one or more suspending agent, neutralizing agent, and reaction propagating agent are selected from the group consisting of N,N-diisopropylethylamine, triethylamine, trimethylamine, sodium hydroxide, potassium hydroxide, sodium carbonate, and potassium carbonate.

In some embodiments of the method, the cement composition also contains water.

In some embodiments of the method, the cement composition has a Young's modulus of about 0.1 gigapascals (GPa) to about 40 GPa, about 3 GPa to about 25 GPa, or about 5 GPa to about 20 GPa at a pressure of about 0.1 megapascal (MPa) to about 150 MPa, about 10 MPa to about 100 MPa, or about 20 MPa to about 40 MPa, at a temperature of about 77° F. to about 450° F., about 125° F. to about 350° F., or about 150° F. to about 200° F. In some embodiments, the cement composition has a Young's modulus of about 5 GPa to about 10 GPa at a pressure of about 20 MPa and a temperature of about 180° F.

In some embodiments of the method, the cement composition has a compressive strength of about 1000 pounds per square inch (psi) to about 10,000 psi, about 2000 psi to about 8000 psi, or about 3500 psi to about 6500 psi, at a pressure of about 0.1 MPa to about 150 MPa, about 10 MPa to about 100 MPa, or about 20 MPa to about 40 MPa, at a temperature of about 77° F. to about 450° F., about 125° F. to about 350° F., or about 150° F. to about 200° F. In some embodiments, the cement composition has a compressive strength of about 5500 psi to about 6500 psi at a pressure of about 20 MPa and a temperature of about 180° F. In some embodiments, addition of the polymeric additive to the cement does not decrease the compressive strength of the cement by more than about 200 psi to about 1000 psi as compared to the compressive strength of the same cement without addition of the polymeric additive.

Also provided is a cement composition for providing long-term zonal isolation in oil wells, comprising cement; and a triazine polymeric additive selected from a polymer with repeat unit A and a polymer with repeat unit B:

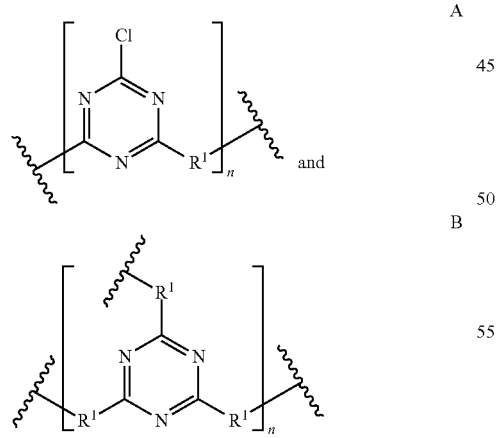

where $R^1$ is selected from the group consisting of a cyclic aliphatic secondary amine, an aromatic diamine, an aromatic diol, an aliphatic diamine, and an aliphatic diol; and n is about 10 to about 1000, about 50 to about 500, or about 100 to about 200.

In some embodiments, $R^1$ is selected from the group consisting of:

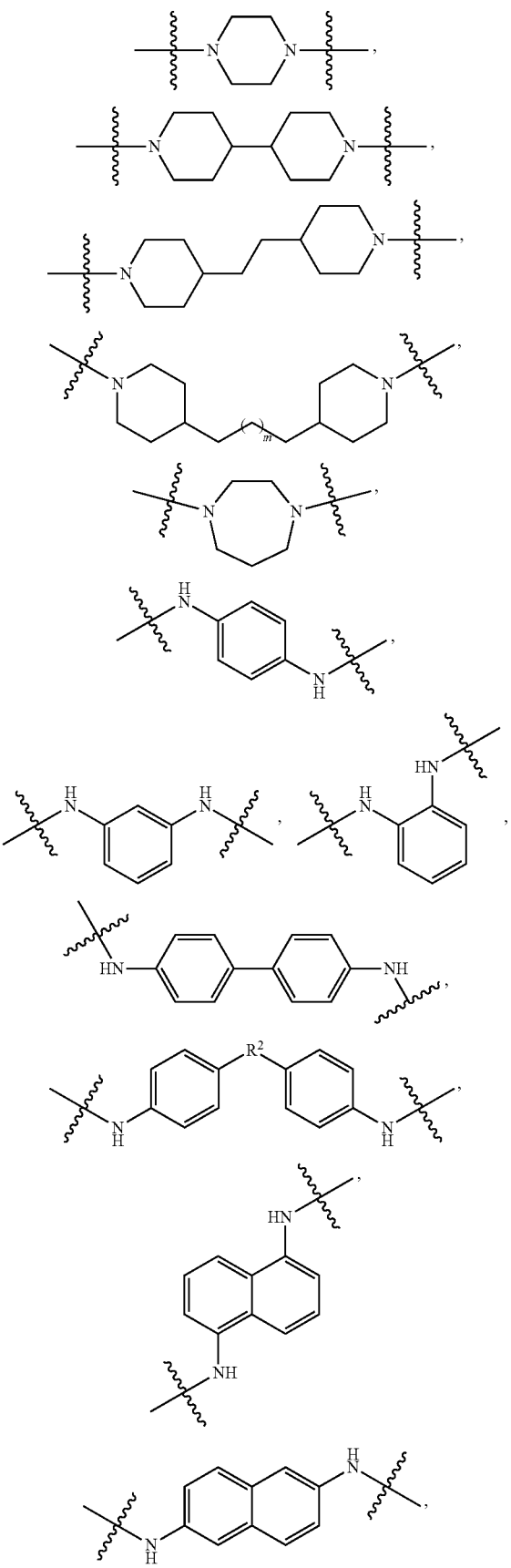

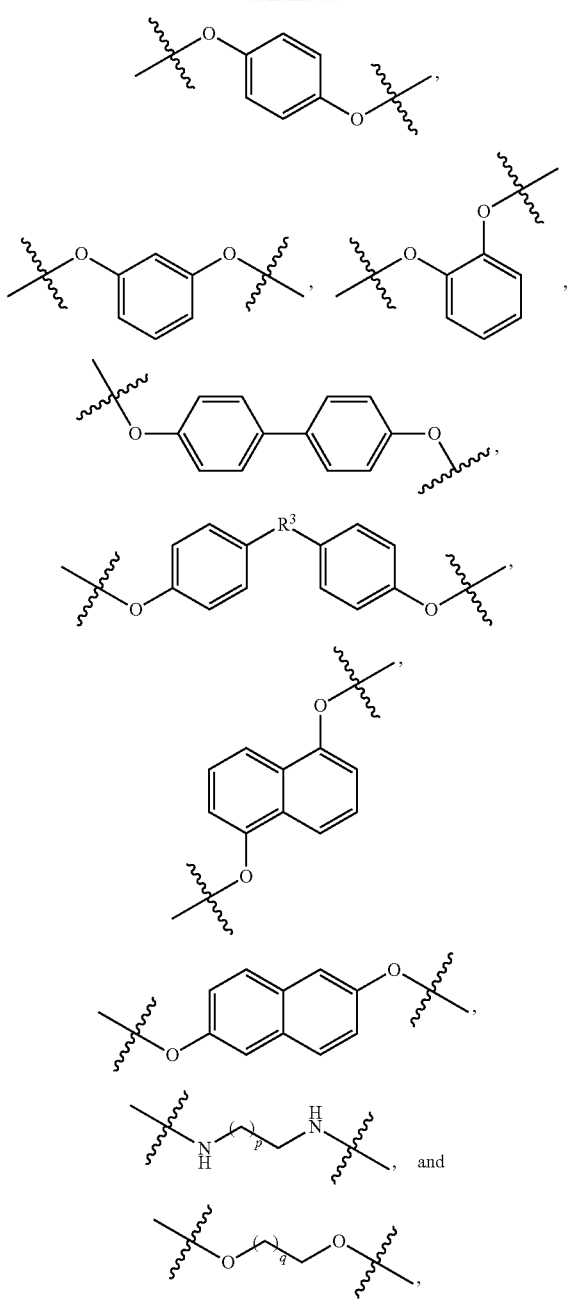

where R[2] and R[3] are each independently selected from the group consisting of $C_1$-$C_6$ alkyl, C(=O), $SO_2$, and O; m is 0 to 6; p is 0 to 8; and q is 0 to 8. In some embodiments, R[1] is

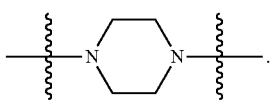

In some embodiments, the polymeric additive is a polymer with repeat unit A and has the structure:

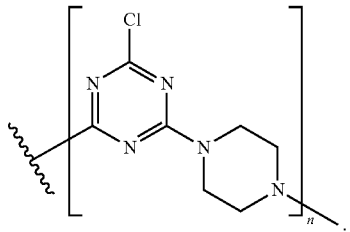

In some embodiments, the polymeric additive is a polymer with repeat unit B and has the structure:

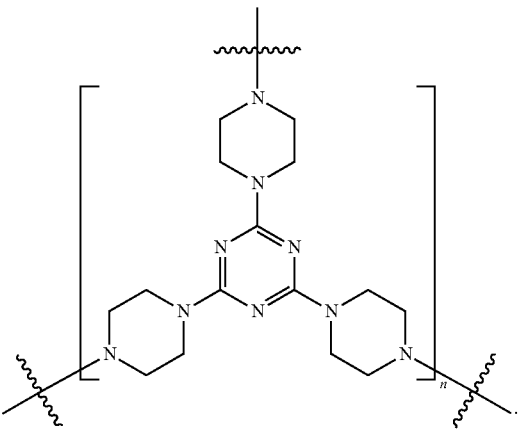

In some embodiments, the amount of polymeric additive in the cement composition is between about 0.1% to about 10% by weight of the cement. In some embodiments, the amount of polymeric additive in the cement composition is about 3% by weight of the cement.

In some embodiments, the cement composition also contains one or more of a suspending agent, a neutralizing agent, and a reaction propagating agent. In some embodiments, the one or more suspending agent, neutralizing agent, and reaction propagating agent are selected from the group consisting of N,N-diisopropylethylamine, triethylamine, trimethylamine, sodium hydroxide, potassium hydroxide, sodium carbonate, and potassium carbonate.

In some embodiments, the cement composition also contains water.

In some embodiments, the cement composition has a Young's modulus of about 0.1 GPa to about 40 GPa, about 3 GPa to about 25 GPa, or about 5 GPa to about 20 GPa at a pressure of about 0.1 MPa to about 150 MPa, about 10 MPa to about 100 MPa, or about 20 MPa to about 40 MPa, at a temperature of about 77° F. to about 450° F., about 125° F. to about 350° F., or about 150° F. to about 200° F. In some embodiments, the cement composition has a Young's modulus of about 5 GPa to about 10 GPa at a pressure of about 20 MPa and a temperature of about 180° F.

In some embodiments, the cement composition has a compressive strength of about 1000 psi to about 10,000 psi, about 2000 psi to about 8000 psi, or about 3500 psi to about 6500 psi, at a pressure of about 0.1 MPa to about 150 MPa, about 10 MPa to about 100 MPa, or about 20 MPa to about 40 MPa, at a temperature of about 77° F. to about 450° F., about 125° F. to about 350° F., or about 150° F. to about 200° F. In some embodiments, the cement composition has a compressive strength of about 5500 psi to about 6500 psi at a pressure of about 20 MPa and a temperature of about 180° F.

Also provided in the present disclosure is a method of preparing a cement composition, comprising: a) reacting a difunctional monomer with cyanuric chloride to form a triazine polymeric additive; and b) mixing the triazine polymeric additive with cement.

In some embodiments of the method, the difunctional monomer is selected from the group consisting of a cyclic aliphatic secondary amine, an aromatic diamine, an aromatic diol, an aliphatic diamine, and an aliphatic diol. In some embodiments, the difunctional monomer is selected from the group consisting of:

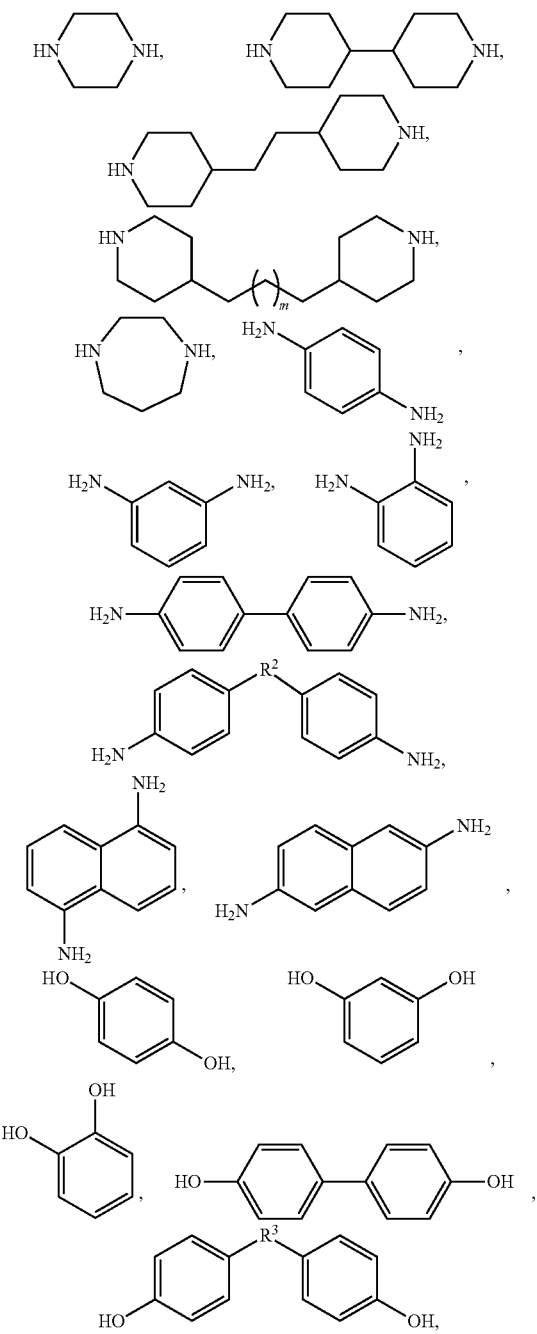

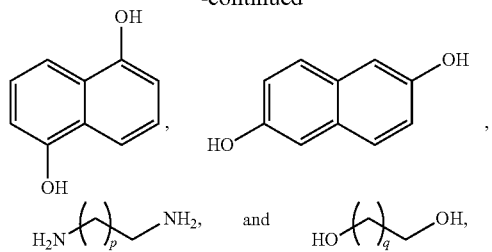

where $R^2$ and $R^3$ are each independently selected from the group consisting of $C_1$-$C_6$ alkyl, $C(=O)$, $SO_2$, and O; m is 0 to 6; p is 0 to 8; and q is 0 to 8. In some embodiments, the difunctional monomer is

In some embodiments of the method, the molar ratio of the cyanuric chloride to the difunctional monomer is about 1:1 to about 1:2. In some embodiments, the molar ratio of the cyanuric chloride to the difunctional monomer is about 1:1. In some embodiments, the triazine polymeric additive has the structure:

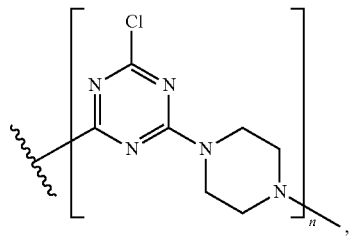

where n is about 10 to about 1000, about 50 to about 500, or about 100 to about 200. In some embodiments, the molar ratio of the cyanuric chloride to the difunctional monomer is about 1:1.5. In some embodiments, the triazine polymeric additive has the structure:

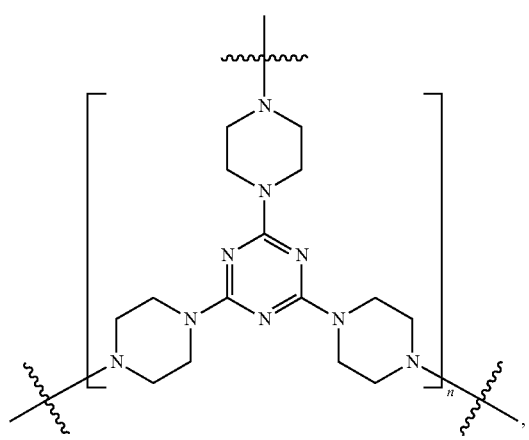

where n is about 10 to about 1000, about 50 to about 500, or about 100 to about 200.

In some embodiments of the method, the amount of polymeric additive in the cement composition is about 0.1% to about 10% by weight of the cement. In some embodiments, the amount of polymeric additive in the cement composition is about 3% by weight of the cement.

In some embodiments of the method, the cement composition also contains one or more of a suspending agent, a neutralizing agent, and a reaction propagating agent. In some embodiments, the one or more suspending agent, neutralizing agent, and reaction propagating agent are selected from the group consisting of N,N-diisopropylethylamine, triethylamine, trimethylamine, sodium hydroxide, potassium hydroxide, sodium carbonate, and potassium carbonate.

In some embodiments of the method, the cement composition also contains water.

DESCRIPTION OF DRAWINGS

FIGS. 1A-1B illustrate two examples of polymeric additives. FIG. 1A shows a linear, ladder-type polymeric structure. FIG. 1B shows an example of a non-linear, branched polymeric structure.

FIG. 2 shows the FT-IR spectra for POLY A and POLY B.

FIGS. 3A-3B depicts the thermogravimetric analyses of POLY A (FIG. 3A) and POLY B (FIG. 3B).

DETAILED DESCRIPTION

Figure 4:
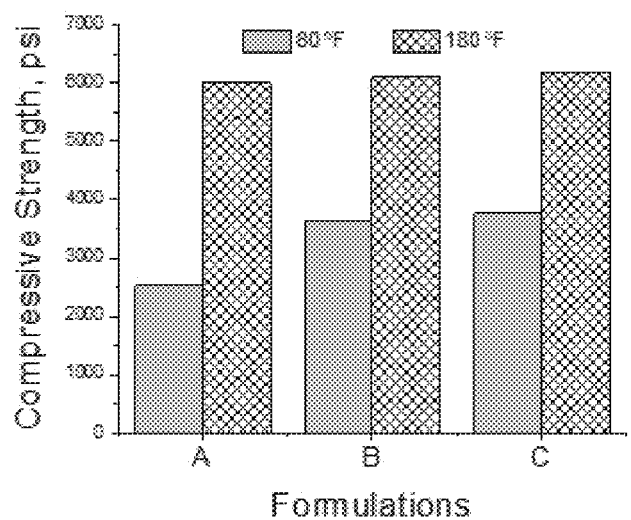
FIG. 4 shows the compressive strengths of cement formulations A-C under confined pressure of 20 MPa at 80° F. and 180° F.

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

The present application provides compositions, such as cement compositions containing polymeric additives, and methods for improving the tensile properties, elastic properties, or both, of cement while having minimum impact on the compressive strength (that is, toughness). Traditional polymeric additives typically do not have strong interactions with the cement particles and instead form weak, interfacial interactions. Such interactions can be separated or ruptured under stresses frequently encountered in downhole conditions, resulting in uneven distribution of stresses in the cement matrix and causing propagation of cracks and failure of the mechanical properties of the cement sheath in the well.

The compositions and methods described in this document have enhanced tensile properties, elastic properties, or both, without a subsequent reduction of compressive strength due to the incorporation of polymeric additives, for example, triazine-based polymeric additives. In some embodiments, the polymeric additives are chemically reactive and form strong, chemical linkages (that is, bonds) with the reactive pendent groups on cement particles during curing of the cement. For example, the polymeric additives can allow for molecular stretching within the polymeric framework upon exerted stresses. In some embodiments, addition of the polymeric additives to cement restricts the propagation of fractures in the cement under downhole conditions. In some embodiments, improvement in the elastic properties of the cement have been observed as compared to neat cement (that is, cement without the polymeric additives). In some embodiments, the compressive strength of the cement is not negatively affected upon addition of the polymeric additives. Thus, the compositions and methods described in this document are designed for use in long-term zonal isolation in oil wells, particularly in severe conditions (for example, extreme temperatures, extreme pressures, or both). In some embodiments, the cement compositions are able to maintain the uniform distribution of stress and provide wellbore stability over long-term downhole conditions.

Definitions

Unless otherwise defined, all technical and scientific terms used in this document have the same meaning as commonly understood by one of ordinary skill in the art to which the present application belongs. Methods and materials are described in this document for use in the present application; other, suitable methods and materials known in the art can also be used. The materials, methods, and examples are illustrative only and not intended to be limiting. All publications, patent applications, patents, sequences, database entries, and other references mentioned in this document are incorporated by reference in their entirety. In case of conflict, the present specification, including definitions, will control.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, and 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

The term "about," as used in this disclosure, can allow for a degree of variability in a value or range, for example, within 10%, within 5%, or within 1% of a stated value or of a stated limit of a range.

As used in this disclosure, the terms "a," "an," and "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In the methods described in this disclosure, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

As used in this disclosure, a "cement" is a binder, for example, a substance that sets and forms a cohesive mass with measurable strengths. A cement can be characterized as non-hydraulic or hydraulic. Non-hydraulic cements (for example, Sorel cements) harden because of the formation of complex hydrates and carbonates, and may require more than water to achieve setting, such as carbon dioxide or mixtures of specific salt combinations. Additionally, too much water cannot be present, and the set material must be kept dry in order to retain integrity and strength. A non-hydraulic cement produces hydrates that are not resistant to water. Hydraulic cements (for example, Portland cement) harden because of hydration, which uses only water in addition to the dry cement to achieve setting of the cement. Cement hydration products, chemical reactions that occur independently of the mixture's water content, can harden even underwater or when constantly exposed to wet weather. The chemical reaction that results when the dry cement powder is mixed with water produces hydrates that are water-soluble. Any cement can be used in the compositions of the present application.

As used in this disclosure, the term "set" can mean the process of a fluid slurry (for example, a cement slurry) becoming a hard solid. Depending on the composition and the conditions, it can take just a few minutes up to 72 hours or longer for some cement compositions to initially set.

As used in this disclosure, the term "$C_{n-m}$ alkyl," employed alone or in combination with other terms, refers to a monovalent saturated hydrocarbon group that can be straight-chain (linear) or branched, having n to m carbons. Examples of alkyl moieties include, but are not limited to, chemical groups such as methyl, ethyl, n-propyl, isopropyl, n-butyl, tert-butyl, isobutyl, sec-butyl; higher homologs such as 2-methyl-1-butyl, n-pentyl, 3-pentyl, n-hexyl, and 1,2,2-trimethylpropyl. In some embodiments, the alkyl group contains from 1 to 6 carbon atoms, from 1 to 4 carbon atoms, from 1 to 3 carbon atoms, or from 1 to 2 carbon atoms.

As used in this disclosure, the term "polymer" can refer to a molecule having at least one repeating unit and can include copolymers.

"Mechanical properties" of cement refer to the properties that contribute to the overall behavior of the cement when subjected to an applied force, such as the frequent stresses cement is exposed to that impact its ability to both protect the casing and maintain zonal isolation. Mechanical properties of cement include compressive strength, elastic strength or the elastic modulus (that is, Young's Modulus), Poisson's ratio (the ratio of lateral strain to longitudinal strain in a material subjected to loading), and tensile strength.

The term "compressive strength" or "compression strength" refer to the measure of the cement's ability to resist loads which tend to compress it or reduce size. Cement composition compressive strengths can vary from 0 psi to over 10,000 psi (0 to over 69 MPa). Compressive strength is generally measured at a specified time after the composition has been mixed and at a specified temperature and pressure. In some embodiments, compressive strength is measured by a non-destructive method that continually measures correlated compressive strength of a cement composition sample throughout the test period by utilizing a non-destructive sonic device. For example, compressive strength of a cement composition can be measured using the non-destructive method according to ANSI/API Recommended Practice 10-B2 at a specified time, temperature, and pressure.

"Elastic strength," as used in this disclosure, describes the ability of the cement to resist permanent deformation when force is applied. Elastic strength is also referred to as Young's Modulus. "Improved elastic properties" means an increase in the elastic strength of the cement or cement composition being referred to.

The term "tensile strength," as used in this disclosure, describes the ability of the cement to resist breaking while being subjected to tension forces. "Improved tensile properties" means an increase in the tensile strength of the cement or cement composition being referred to.

As used in this disclosure, "zonal isolation" means the prevention of fluids, such as water or gas, in one zone of a well or subterranean formation, from mixing with oil in another zone.

The term "downhole," as used in this disclosure, can refer to under the surface of the earth, such as a location within or fluidly connected to a wellbore.

As used in this disclosure, the term "subterranean formation" can refer to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region that is in fluid contact with the wellbore. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground that is in fluid contact with liquid or gaseous petroleum materials or water. In some embodiments, a subterranean formation is an oil well.

As used in this disclosure, "treatment of a subterranean formation" can include any activity directed to extraction of water or petroleum materials from a subterranean petroleum- or water-producing formation or region, for example, drilling, stimulation, hydraulic fracturing, clean-up, acidizing, completion, cementing, remedial treatment, and abandonment.

Cement Compositions Containing Polymeric Additives

Provided in this disclosure is a composition containing cement and a polymeric additive, for example, a triazine-based polymeric additive, that exhibits improved mechanical properties (for example, improved elastic properties, tensile properties, toughness, compression strength, or a combination of such properties) as compared to the same cement composition that does not contain the polymeric additive. In some embodiments, the triazine-based polymeric additive improves the toughness of the cement, for example, in the construction of subterranean oil and gas wells or for above-ground cement construction applications. In some embodiments, the composition contains one or more additional agents, such as a suspending agent, a neutralizing agent, or a reaction propagating agent. In some embodiments, the composition contains water.

Cement

The compositions of the present application contain cement and a polymeric additive, for example, a triazine-based polymeric additive. The cement can be any type of cement used in the construction of subterranean oil and gas wells, or any cement used in above-ground cement construction applications. In some embodiments, the cement is Portland cement. Examples of cements that can be used in the compositions include, but are not limited to Class A, Class B, Class G, and Class H cements.

Polymeric Additive

In some embodiments, the polymeric additive is a triazine-based polymeric additive. The polymeric additive can be synthesized from cyanuric chloride and a difunctional monomer. In some embodiments, the reaction between the cyanuric chloride and the difunctional monomer releases hydrogen chloride to form the polymeric backbone.

The trifunctional monomer, cyanuric chloride, can be modified by substituting one or more of its three chloride groups at various reaction temperatures. The temperature-dependent substitution of the chloride groups is shown in Scheme 1.

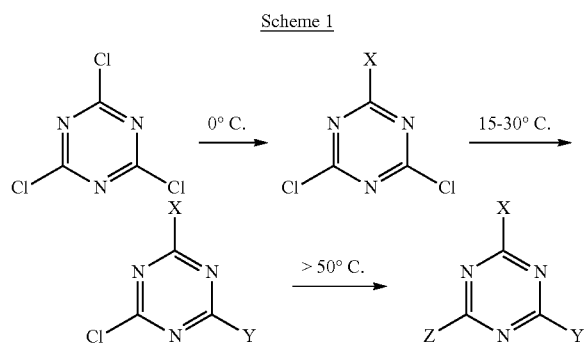

Scheme 1

The first chloride group can be replaced by an X moiety at about 0° C. Subsequently, the second and third chloride groups can be replaced by Y and Z at about 15-30° C. and more than about 50° C., respectively. In some embodiments, the temperature-dependent nucleophilic substitution of cyanuric chloride is employed to synthesize a series of polymeric additives for use in the cement compositions described in the present application. In some embodiments, one of the three chloride groups is substituted with a difunctional monomer. In some embodiments, two of the three chloride groups are substituted with a difunctional monomer. In some embodiments, all of the three chloride groups are substituted with a difunctional monomer.

In some embodiments, the difunctional monomer that reacts with the cyanuric chloride to form the polymeric additive of the present application is selected from the group consisting of a cyclic aliphatic secondary amine, an aromatic diamine, an aromatic diol, an aliphatic diamine, and an aliphatic diol.

In some embodiments, the difunctional monomer is a cyclic aliphatic secondary amine. Examples of cyclic aliphatic secondary amines include, but are not limited to piperazine, 4,4'-dipiperidine, 4,4'-dimethylenedipiperidine, 4,4'-trimethylenedipiperidine, 1,4-di(piperidin-4-yl)butane, 1,5-di(piperidin-4-yl)pentane, 1,6-di(piperidin-4-yl)hexane, 1,7-di(piperidin-4-yl)heptane, 1,8-di(piperidin-4-yl)octane, and homopiperazine. In some embodiments, the difunctional monomer is piperazine.

In some embodiments, the difunctional monomer is an aromatic diamine. Examples of aromatic diamines include, but are not limited to benzene-1,2-diamine, benzene-1,3-diamine, benzene-1,4-diamine, benzidine, bis(4-aminophenyl)methanone, 4,4'-sulfonyldianiline, 4,4'-oxydianiline, 4,4'-methylenedianiline, 4,4'-(ethane-1,2-diyl)dianiline, 4,4'-(propane-1,3-diyl)dianiline, 4,4'-(butane-1,4-diyl)dianiline, 4,4'-(pentane-1,5-diyl)dianiline, 4,4'-(hexane-1,6-diyl)dianiline, 4,4'-(heptane-1,7-diyl)dianiline, 4,4'-(octane-1,8-diyl)dianiline, naphthalene-1,5-diamine, and naphthalene-2,6-diamine.

In some embodiments, the difunctional monomer is an aromatic diol. Examples of aromatic diols include, but are not limited to hydroquinone, resorcinol, pyrocatechol, [1,1'-biphenyl]-4,4'-diol, 4,4'-methylenediphenol, 4,4'-(ethane-1,2-diyl)diphenol, 4,4'-(propane-1,3-diyl)diphenol, 4,4'-(butane-1,4-diyl)diphenol, 4,4'-(pentane-1,5-diyl)diphenol, 4,4'-(hexane-1,6-diyl)diphenol, 4,4'-(heptane-1,7-diyl)diphenol, 4,4'-(octane-1,8-diyl)diphenol, naphthalene-1,5-diol, and naphthalene-2,6-diol.

In some embodiments, the difunctional monomer is an aliphatic diamine. Examples of aliphatic diamines include, but are not limited to methanediamine, ethane-1,2-diamine, propane-1,3-diamine, butane-1,4-diamine, pentane-1,5-diamine, hexane-1,6-diamine, heptane-1,7-diamine, octane-1,8-diamine, and nonane-1,9-diamine.

In some embodiments, the difunctional monomer is an aliphatic diol. Examples of aliphatic diols include, but are not limited to methanediol, ethane-1,2-diol, propane-1,3-diol, butane-1,4-diol, pentane-1,5-diol, hexane-1,6-diol, heptane-1,7-diol, octane-1,8-diol, and nonane-1,9-diol.

In some embodiments, the difunctional monomer is selected from the group consisting of:

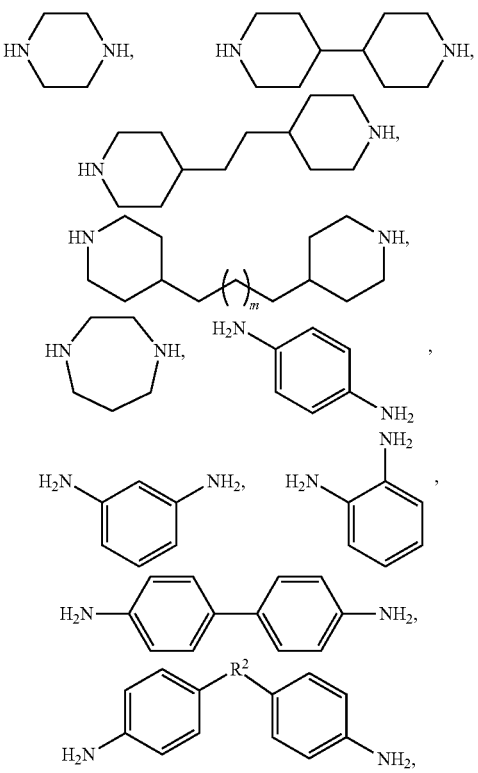

-continued

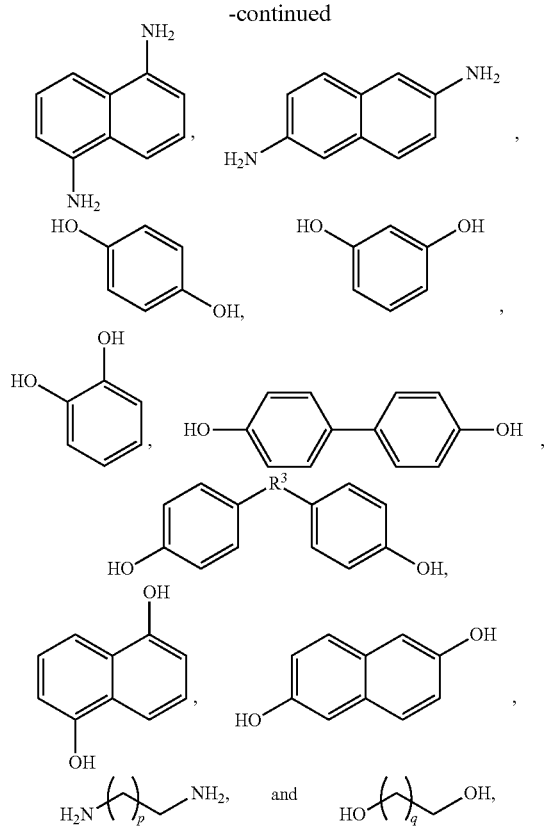

where:
R² and R³ are each independently selected from the group consisting of C₁-C₆ alkyl, C(=O), SO₂, and 0;
m is 0 to 6;
p is 0 to 8; and
q is 0 to 8.
In some embodiments, the difunctional monomer is

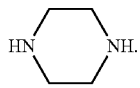

In some embodiments, to obtain the desired polymer or polymeric structure, the synthesis of the polymeric additive is controlled, as described in this disclosure and shown in Scheme 1, by controlling the reaction temperature. In other embodiments, the synthesis of the polymeric additive is controlled by adjusting the molar ratio of cyanuric chloride to difunctional monomer.

In some embodiments, the cyanuric chloride and difunctional monomer react to form a polymeric additive that is a linear, ladder-type of polymer having a general structure as shown in FIG. 1A. This type of polymer can have reactive chloride groups on the polymeric chain (on the cyanuric chloride monomer). In some embodiments, the chloride groups of the polymeric additive react with cement particles, for example, the chloride groups react with the hydroxyl functional groups on the cement particles, to form chemical bonds. In some embodiments, the other functional groups (for example, nitrogen atoms) of the polymeric additive interact with the cement particles and form linkages. In some embodiments, the other functional groups (for example, nitrogen atoms) of the polymeric additive form electrostatic bonds with the cement particles. In some embodiments, the polymeric additive has repeating units of the structure A:

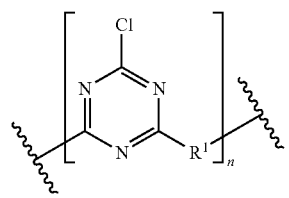

where R¹ is selected from the group consisting of a cyclic aliphatic secondary amine, an aromatic diamine, an aromatic diol, an aliphatic diamine, and an aliphatic diol; and n is about 10 to about 1000, such as about 50 to about 500, or about 100 to about 200.

In some embodiments, R¹ is one of the difunctional monomers described in this disclosure. In some embodiments, R¹ is selected from the group consisting of:

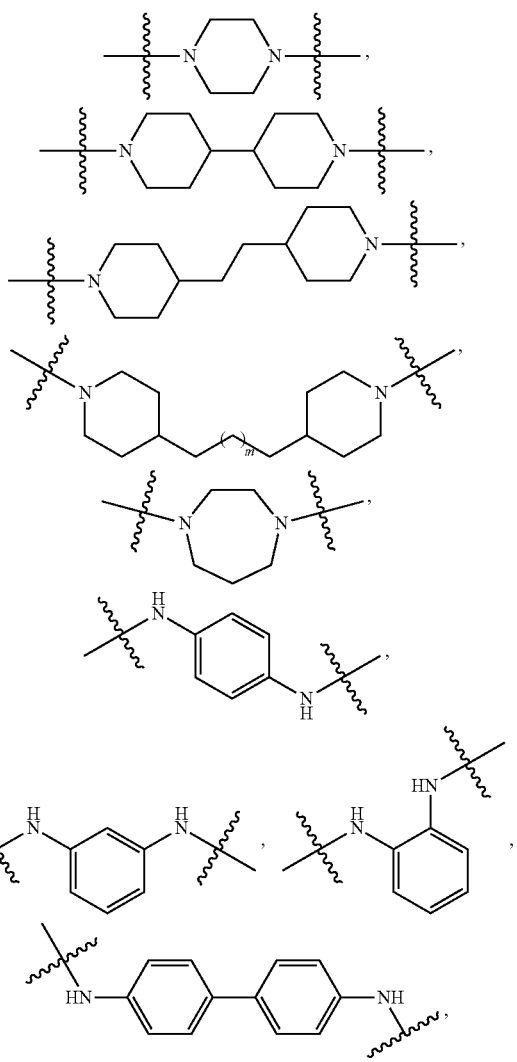

-continued

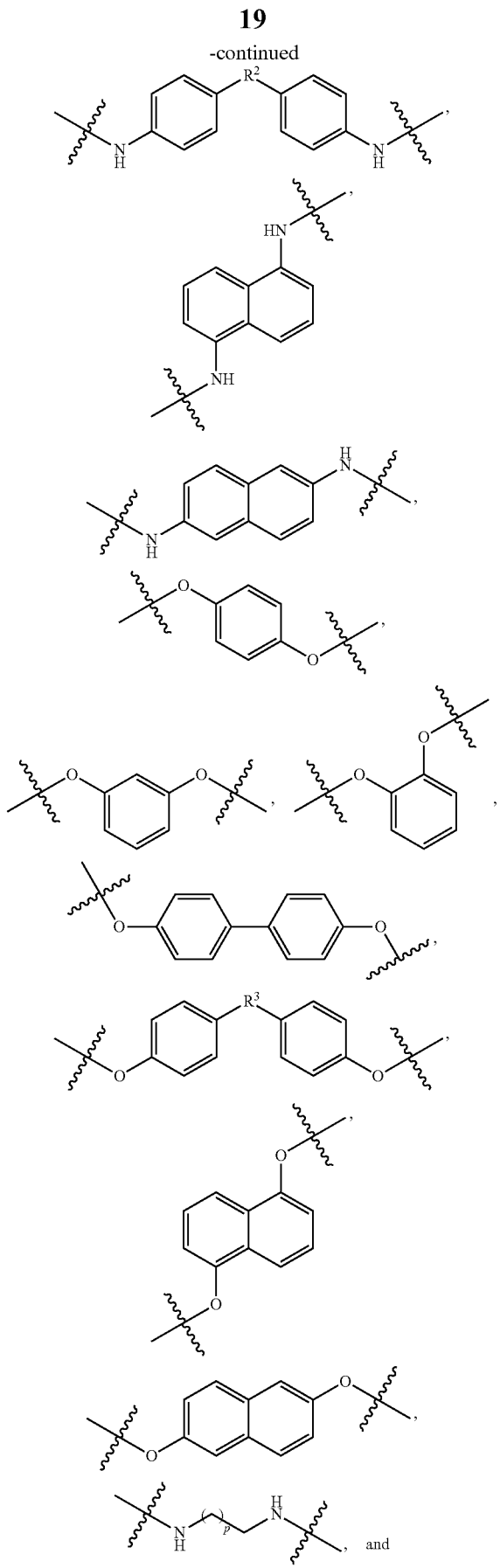

, and

-continued

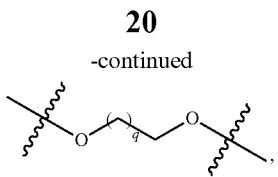

where:

$R^2$ and $R^3$ are each independently selected from the group consisting of $C_1$-$C_6$ alkyl, $C(=O)$, $SO_2$, and O;

m is 0 to 6;

p is 0 to 8; and q is 0 to 8.

In some embodiments, n is an integer ranging in value from about 10 to about 1000, such as about 10 to about 900, about 10 to about 800, about 10 to about 700, about 10 to about 600, about 10 to about 500, about 10 to about 400, about 10 to about 300, about 10 to about 200, about 10 to about 100, about 10 to about 50, about 50 to about 1000, about 50 to about 900, about 50 to about 800, about 50 to about 700, about 50 to about 600, about 50 to about 500, about 50 to about 400, about 50 to about 300, about 50 to about 200, about 50 to about 100, about 100 to about 1000, about 100 to about 900, about 100 to about 800, about 100 to about 700, about 100 to about 600, about 100 to about 500, about 100 to about 400, about 100 to about 300, about 100 to about 200, about 200 to about 1000, about 200 to about 900, about 200 to about 800, about 200 to about 700, about 200 to about 600, about 200 to about 500, about 200 to about 400, about 200 to about 300, about 300 to about 1000, about 300 to about 900, about 300 to about 800, about 300 to about 700, about 300 to about 600, about 300 to about 500, about 300 to about 400, about 400 to about 1000, about 400 to about 900, about 400 to about 800, about 400 to about 700, about 400 to about 600, about 400 to about 500, about 500 to about 1000, about 500 to about 900, about 500 to about 800, about 500 to about 700, about 500 to about 600, about 600 to about 1000, about 600 to about 900, about 600 to about 800, about 600 to about 700, about 700 to about 1000, about 700 to about 900, about 700 to about 800, about 800 to about 1000, about 800 to about 900, about 900 to about 1000, or about 10, about 25, about 50, about 75, about 100, about 150, about 200, about 250, about 300, about 350, about 400, about 450, about 500, about 550, about 600, about 700, about 750, about 800, about 850, about 900, about 950, or about 1000. In some embodiments, n is about 10 to about 1000. In some embodiments, n is about 50 to about 500. In some embodiments, n is about 100 to about 200.

In some embodiments, $R^1$ is

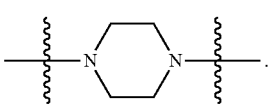

In some embodiments, the polymeric additive is a polymer with repeating units having the structure:

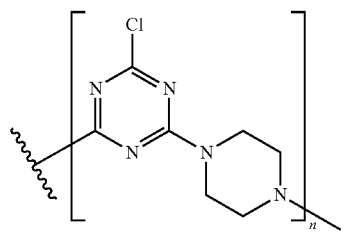

In some embodiments, cyanuric chloride reacts with piperazine, to form a linear, ladder-type polymer with the general structure:

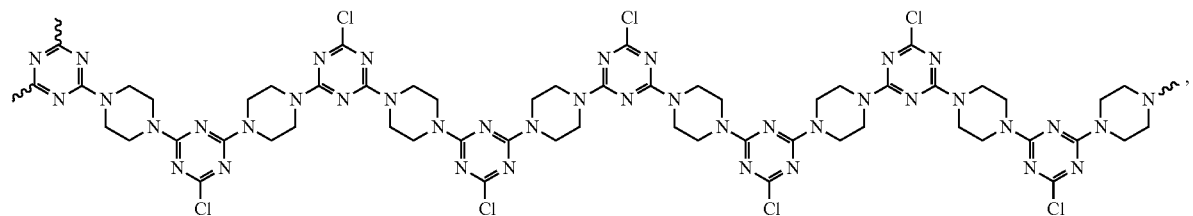

where the wavy lines indicate further bonding to either a cyanuric chloride monomer or a piperazine monomer.

In some embodiments, the cyanuric chloride and difunctional monomer react to form a polymeric additive that is a non-linear, branched polymer having a general structure as shown in FIG. 1B. This type of polymer lacks reactive chloride groups on the polymeric chain. In some embodiments, the polymeric additive forms physical bonds with the cement particles. In some embodiments, the other functional groups (for example, nitrogen atoms) of the polymeric additive interact with the cement particles and form linkages. In some embodiments, the other functional groups (for example, nitrogen atoms) of the polymeric additive form electrostatic bonds with the cement particles. In some embodiments, the polymeric additive has repeating units of the structure B:

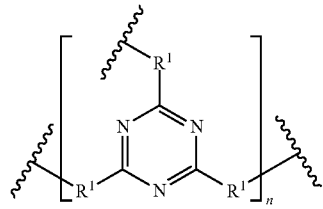

where $R^1$ is selected from the group consisting of a cyclic aliphatic secondary amine, an aromatic diamine, an aromatic diol, an aliphatic diamine, and an aliphatic diol; and n is about 10 to about 1000, such as about 50 to about 500, or about 100 to about 200.

In some embodiments, $R^1$ is one of the difunctional monomers described in this disclosure. In some embodiments, $R^1$ is selected from the group consisting of:

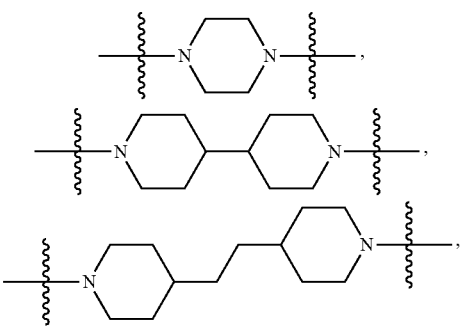

-continued

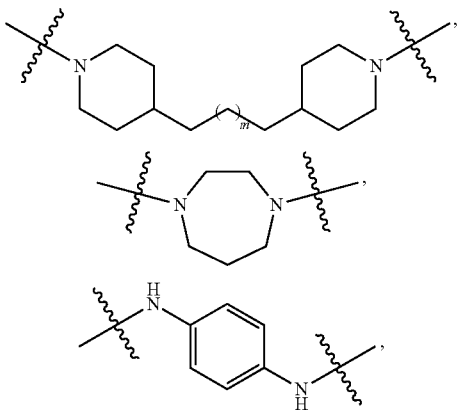

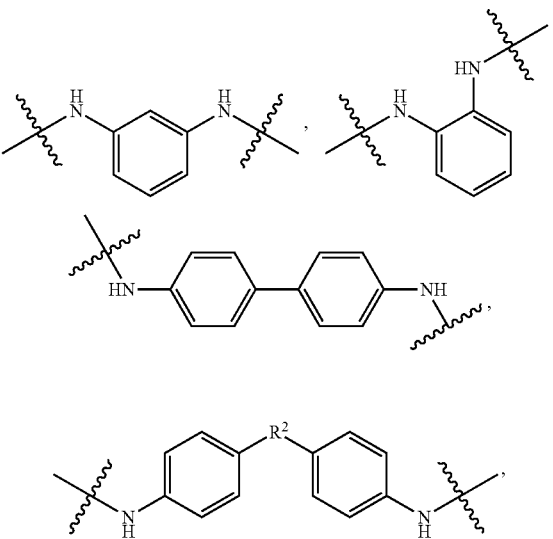

-continued

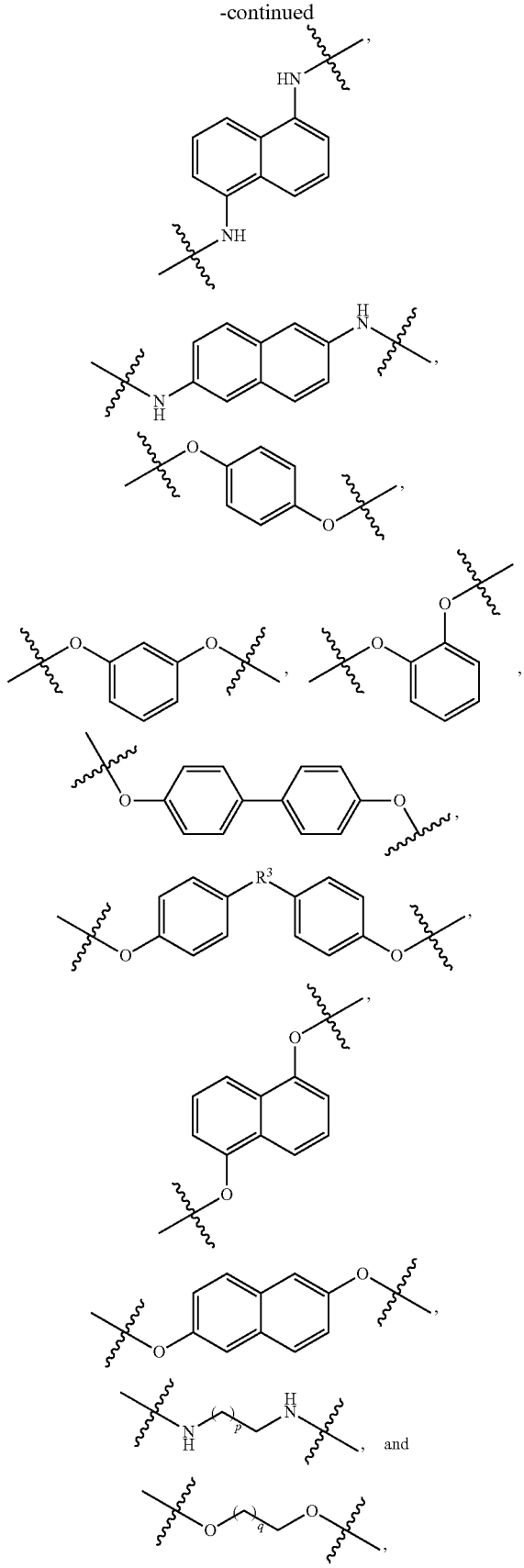

and where:

$R^2$ and $R^3$ are each independently selected from the group consisting of $C_1$-$C_6$ alkyl, $C(=O)$, $SO_2$, and $O$;

m is 0 to 6;

p is 0 to 8; and q is 0 to 8.

In some embodiments, n is an integer ranging in value from about 10 to about 1000, such as about 10 to about 900, about 10 to about 800, about 10 to about 700, about 10 to about 600, about 10 to about 500, about 10 to about 400, about 10 to about 300, about 10 to about 200, about 10 to about 100, about 10 to about 50, about 50 to about 1000, about 50 to about 900, about 50 to about 800, about 50 to about 700, about 50 to about 600, about 50 to about 500, about 50 to about 400, about 50 to about 300, about 50 to about 200, about 50 to about 100, about 100 to about 1000, about 100 to about 900, about 100 to about 800, about 100 to about 700, about 100 to about 600, about 100 to about 500, about 100 to about 400, about 100 to about 300, about 100 to about 200, about 200 to about 1000, about 200 to about 900, about 200 to about 800, about 200 to about 700, about 200 to about 600, about 200 to about 500, about 200 to about 400, about 200 to about 300, about 300 to about 1000, about 300 to about 900, about 300 to about 800, about 300 to about 700, about 300 to about 600, about 300 to about 500, about 300 to about 400, about 400 to about 1000, about 400 to about 900, about 400 to about 800, about 400 to about 700, about 400 to about 600, about 400 to about 500, about 500 to about 1000, about 500 to about 900, about 500 to about 800, about 500 to about 700, about 500 to about 600, about 600 to about 1000, about 600 to about 900, about 600 to about 800, about 600 to about 700, about 700 to about 1000, about 700 to about 900, about 700 to about 800, about 800 to about 1000, about 800 to about 900, about 900 to about 1000, or about 10, about 25, about 50, about 75, about 100, about 150, about 200, about 250, about 300, about 350, about 400, about 450, about 500, about 550, about 600, about 700, about 750, about 800, about 850, about 900, about 950, or about 1000. In some embodiments, n is about 10 to about 1000. In some embodiments, n is about 50 to about 500. In some embodiments, n is about 100 to about 200.

In some embodiments, $R^1$ is

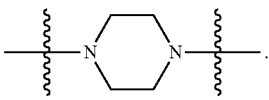

In some embodiments, the polymeric additive is a polymer with repeating units having the structure:

In some embodiments, cyanuric chloride reacts with piperazine, to form a non-linear, branched polymer with the general structure:

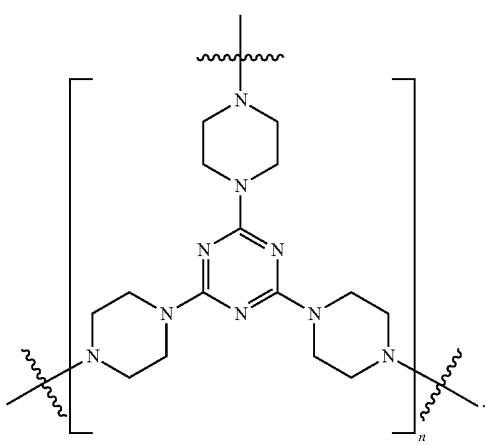

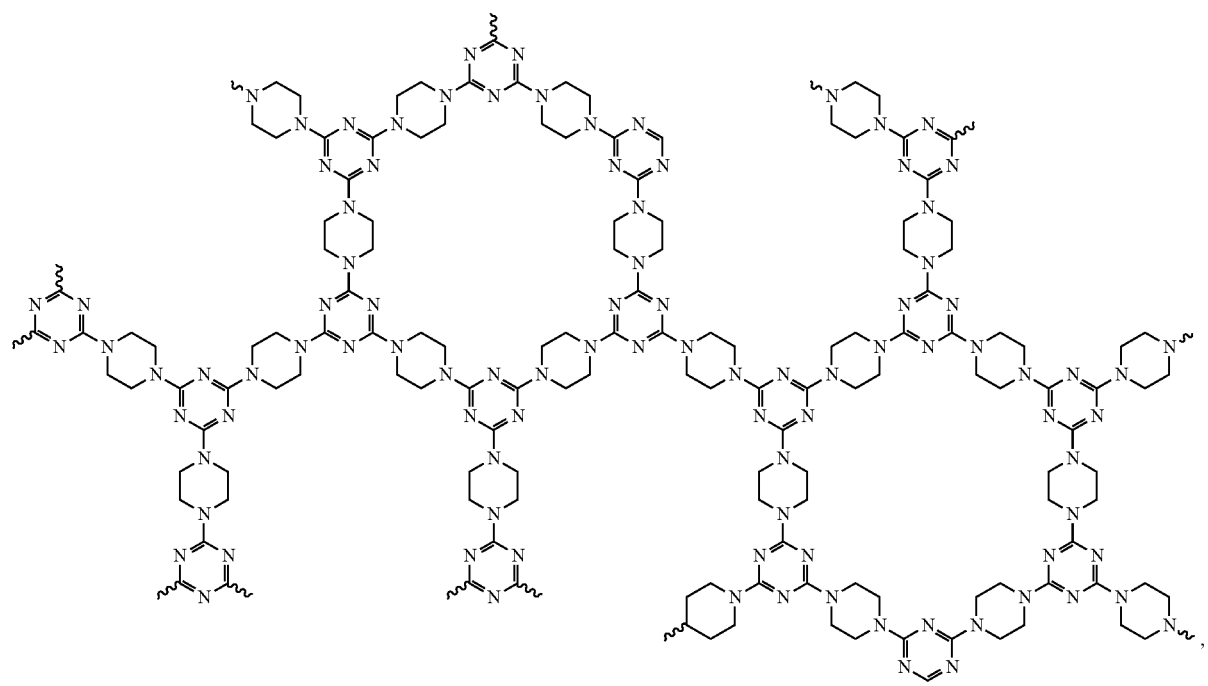

where the wavy lines indicate further bonding to either a cyanuric chloride monomer or a piperazine monomer.

In some embodiments, the polymeric additive has a weight-average molecular weight of about 1 kilodalton (kDa) to about 2,500 kDa, for example, a weight-average molecular weight of about 1 kDa to about 2,000 kDa, about 1 kDa to about 1,500 kDa, about 1 kDa to about 1,000 kDa, about 1 kDa to about 750 kDa, about 1 kDa to about 500 kDa, about 1 kDa to about 250 kDa, about 1 kDa to about 100 kDa, about 1 kDa to about 10 kDa, about 10 kDa to about 2,500 kDa, about 10 kDa to about 2,000 kDa, about 10 kDa to about 1,500 kDa, about 10 kDa to about 1,000 kDa, about 10 kDa to about 750 kDa, about 10 kDa to about 500 kDa, about 10 kDa to about 250 kDa, about 10 kDa to about 100 kDa, about 100 kDa to about 2,500 kDa, about 100 kDa to about 2,000 kDa, about 100 kDa to about 1,500 kDa, about 100 kDa to about 1,000 kDa, about 100 kDa to about 750 kDa, about 100 kDa to about 500 kDa, about 100 kDa to about 250 kDa, about 250 kDa to about 2,500 kDa, about 250 kDa to about 2,000 kDa, about 250 kDa to about 1,500 kDa, about 250 kDa to about 1,000 kDa, about 250 kDa to about 750 kDa, about 250 kDa to about 500 kDa, about 500 kDa to about 2,500 kDa, about 500 kDa to about 2,000 kDa, about 500 kDa to about 1,500 kDa, about 500 kDa to about 1,000 kDa, about 500 kDa to about 750 kDa, about 750 kDa to about 2,500 kDa, about 750 kDa to about 2,000 kDa, about 750 kDa to about 1,500 kDa, about 750 kDa to about 1,000 kDa, about 1,000 kDa to about 2,500 kDa, about 1,000 kDa to about 2,000 kDa, about 1,000 kDa to about 1,500 kDa, about 1,500 kDa to about 2,500 kDa, about 1,500 kDa to about 2,000 kDa, about 2,000 kDa to about 2,500 kDa, or about 1 kDa, about 10 kDa, about 50 kDa, about 100 kDa, about 250 kDa, about 500 kDa, about 750 kDa, about 1,000 kDa, about 1,250 kDa, about 1,500 kDa, about 1,750 kDa, about 2,000 kDa, about 2,225 kDa, or about 2,500 kDa.

In some embodiments, the amount of polymeric additive in the cement composition is about 0.1% to about 10% by weight of the cement. For example, the polymeric additive can be about 0.1% to about 9%, about 0.1% to about 8%, about 0.1% to about 7%, about 0.1% to about 6%, about 0.1% to about 5%, about 0.1% to about 4%, about 0.1% to about 3%, about 0.1% to about 2%, about 0.1% to about 1%, about 0.1% to about 0.5%, about 0.5% to about 10%, about 0.5% to about 9%, about 0.5% to about 8%, about 0.5% to about 7%, about 0.5% to about 6%, about 0.5% to about 5%, about 0.5% to about 4%, about 0.5% to about 3%, about 0.5% to about 2%, about 0.5% to about 1%, about 1% to about 10%, about 1% to about 9%, about 1% to about 8%, about 1% to about 7%, about 1% to about 6%, about 1% to about 5%, about 1% to about 4%, about 1% to about 3%, about 1% to about 2%, about 2% to about 10%, about 2% to about 9%, about 2% to about 8%, about 2% to about 7%, about 2% to about 6%, about 2% to about 5%, about 2% to about 4%, about 2% to about 3%, about 3% to about 10%, about 3% to about 9%, about 3% to about 8%, about 3% to about 7%, about 3% to about 6%, about 3% to about 5%, about 3% to about 4%, about 4% to about 10%, about 4% to about 9%, about 4% to about 8%, about 4% to about 7%, about 4% to about 6%, about 4% to about 5%, about 5% to about 10%, about 5% to about 9%, about 5% to about 8%, about 5% to about 7%, about 5% to about 6%, about 6% to about 10%, about 6% to about 9%, about 6% to about 8%, about 6% to about 7%, about 7% to about 10%, about 7% to about 9%, about 7% to about 8%, about 8% to about 10%, about 8% to about 9%, about 9% to about 10%, or about 0.1%, about 0.5%, about 1%, about 1.5%, about 2%, about 2.5%, about 3%, about 3.5%, about 4%, about 4.5%, about 5%, about 5.5%, about 6%, about 6.5%, about 7%, about 7.5%, about 8%, about 8.5%, about 9%, about 9.5%, or about 10% by weight of the cement. In some embodiments, the polymeric additive is about 3% by weight of the cement.

Additional Components

In some embodiments, the cement composition also contains one or more of a suspending agent, a neutralizing agent, and a reaction propagating agent. Suitable suspending agents, neutralizing agents, and reaction propagating agents include, but are not limited to, polymers, N,N-diisopropylethylamine, triethylamine, trimethylamine, sodium hydroxide, potassium hydroxide, sodium carbonate, and potassium carbonate, and combinations thereof. In some embodiments, the suspending agent is a polymer. In some embodiments, the polymer is a dry polymer that is useful in improving the suspension and free water control of cement slurries in fresh and some salt water slurries at elevated temperatures. An exemplary polymer that can be used in the cement compositions of the present application is FSA-3 by Fritz Industries (Mesquite, Tex.). The suspending agent, neutralizing agent, reaction propagating agent, or a combination thereof can be about 0.1% to about 2.5% by weight of the cement, for example, about 0.1% to about 1%, or about 0.2% to about 0.5% by weight of the cement, or about 0.1%, about 0.2%, about 0.3%, about 0.4%, about 0.5%, about 0.75%, about 1%, about 1.25%, about 1.5%, about 1.75%, or about 2% by weight of the cement. In some embodiments, when one or more of a suspending agent, a neutralizing agent, and a reaction propagating agent are present, the amount is about 0.4% by weight of the cement.

In some embodiments, the cement composition also contains water. The composition can contain about 1% to about 50% water, by weight of the composition, for example, about 10% to about 50%, about 20% to about 45%, about 30% to about 40%, or about 1%, about 5%, about 10%, about 15%, about 20%, about 25%, about 30%, about 35%, about 39%, about 40%, about 45%, or about 50% water, by weight of the composition. In some embodiments, the amount of water is about 39% by weight of the composition. In some embodiments, the amount of water is about 40% by weight of the composition.

Properties of the Cement Composition

In some embodiments, the cement composition of the present application exhibits improved elastic properties as compared to the same composition without the polymeric additive. In some embodiments, the cement composition has a Young's modulus of about 0.1 GPa to about 40 GPa, about 3 GPa to about 25 GPa, or about 5 GPa to about 20 GPa at a pressure of about 0.1 MPa to about 150 MPa, about 10 MPa to about 100 MPa, or about 20 MPa to about 40 MPa, at a temperature of about 77° F. to about 450° F., about 125° F. to about 350° F., or about 150° F. to about 200° F. In some embodiments, the cement composition has a Young's modulus of about 5 GPa to about 10 GPa at a pressure of about 20 MPa and a temperature of about 180° F.

In some embodiments, addition of the polymeric additive to the cement does not decrease the compressive strength of the cement as compared to the same composition without the polymeric additive. Without wishing to be bound by any particular theory, it is believed that the triazine ring in the polymeric network, a carbon nitride-type moiety, and the difunctional monomer, for example, piperazine or any of the other difunctional monomers described in this disclosure, are flexible enough to undergo stretching under stresses. The organic and inorganic blocks within the polymer network can preserve compressive strength and provide flexibility at the molecular level upon applied stresses. In some embodiments, addition of the polymeric additive to the cement does not decrease the compressive strength of the cement by more than about 200 psi to about 1000 psi as compared to the compressive strength of the same cement without addition of the polymeric additive. For example, the compressive strength of the cement does not decrease by more than about 200 psi, about 300 psi, about 400 psi, about 500 psi, about 600 psi, about 700 psi, about 800 psi, about 900 psi, or about 1000 psi as compared to the compressive strength of the same cement without addition of the polymeric additive. In some embodiments, the cement composition has a compressive strength of about 1000 psi to about 10,000 psi, about 2000 psi to about 8000 psi, or about 3500 psi to about 6500 psi, at a pressure of about 0.1 MPa to about 150 MPa, about 10 MPa to about 100 MPa, or about 20 MPa to about 40 MPa, at a temperature of about 77° F. to about 450° F., about 125° F. to about 350° F., or about 150° F. to about 200° F. In some embodiments, the cement composition has a compressive strength of about 5500 psi to about 6500 psi at a pressure of about 20 MPa and a temperature of about 180° F.

In some embodiments, the cement composition of the present application exhibits improved toughness or stiffness when exposed to severe conditions (for example, extreme temperatures, pressures, or both). For example, the cement composition can exhibit improved elastic properties, such as a reduction in the Young's modulus, without exhibiting a substantial change in the compressive strength of the composition (for example, a decrease of the compressive strength of the cement by more than about 200 psi to about 1000 psi), after exposure to elevated temperatures, pressures, or both. In some embodiments, the cement composition exhibits a reduction of the Young's modulus of about 5% to about 30%, such as about 10% to about 25%, about 15% to about 20%, about 10% to about 20%, about 10% to about 30%, about 15% to about 30%, about 15% to about 25%, or a reduction of about 5%, about 6%, about 7%, about 8%, about 9%, about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, or about 30%, without exhibiting a substantial change in the compressive strength of the composition (for example, a decrease of the compressive strength of the cement by more than about 200 psi to about 1000 psi), after exposure of the cement composition to elevated temperatures, as compared to the Young's modulus and compressive strength of the cement composition prior to exposure to the elevated temperatures.

Process of Preparing the Cement Composition

Provided in the present application is a method of preparing a cement composition, such as a cement composition described in this application. In some embodiments, the method comprises: a) reacting a difunctional monomer described in this disclosure with cyanuric chloride to form a triazine polymeric additive; and b) mixing the triazine polymeric additive with cement.

In some embodiments of the method, the molar ratio of the cyanuric chloride reacted with the difunctional monomer is about 1:5 to about 5:1. For example, the molar ratio of cyanuric chloride to difunctional monomer can be about 1:4 to about 4:1, about 1:3 to about 3:1, about 1:2 to about 2:1, about 1:1 to about 1:2, about 1:1 to about 1:1.5, or about 1:5, about 1:4, about 1:3, about 1:2, about 1:1.5, about 1:1, about 2:1, about 3:1, about 4:1, or about 5:1. In some embodiments, the molar ratio of cyanuric chloride to difunctional monomer is about 1:1 to about 1:2. In some embodiments, the molar ratio of cyanuric chloride to difunctional monomer is about 1:1.5. In some embodiments, the molar ratio of cyanuric chloride to difunctional monomer is about 1:1.

In some embodiments of the method, the molar ratio of cyanuric chloride to difunctional monomer is about 1:1. In some embodiments, the triazine polymeric additive that is formed is a polymer with repeat units having structure A:

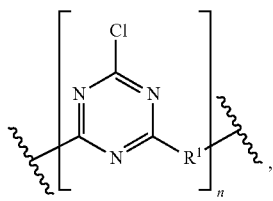

where $R^1$ represents a difunctional monomer as described in this application and n is about 10 to about 1000, about 50 to about 500, or about 100 to about 200. In some embodiments of the method, $R^1$ is

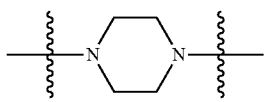

and the triazine polymeric additive that is formed is a polymer with repeat units having the structure:

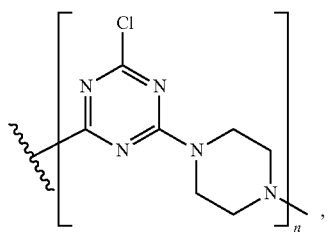

where n is about 10 to about 1000, about 50 to about 500, or about 100 to about 200.

In some embodiments of the method, the molar ratio of cyanuric chloride to difunctional monomer is about 1:1.5. In some embodiments, the triazine polymeric additive that is formed is a polymer with repeat units having structure B:

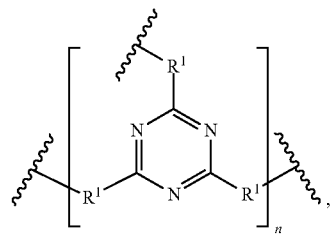

where $R^1$ represents a difunctional monomer as described in this application and n is about 10 to about 1000, about 50 to about 500, or about 100 to about 200. In some embodiments of the method, $R^1$ is

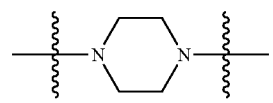

and the triazine polymeric additive that is formed is a polymer with repeat units having the structure:

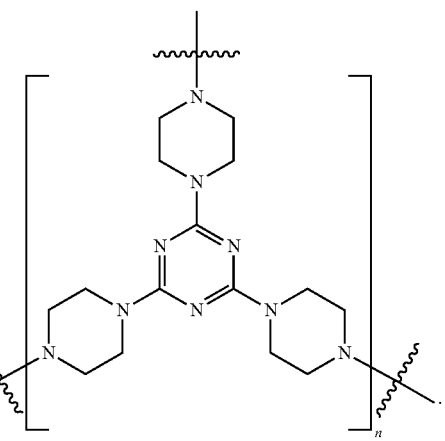

where n is about 10 to about 1000, about 50 to about 500, or about 100 to about 200.

In some embodiments, the method involves reacting the difunctional monomer described in this disclosure with cyanuric chloride in the presence of a solvent, for example, an organic solvent. Suitable solvents for use in the described methods include any organic solvent, including, but not limited to, 1,4-dioxane, tetrahydrofuran, acetonitrile, dichloromethane, chloroform, N,N-dimethylformamide, and N-methylpyrrolidone. In some embodiments, the solvent is 1,4-dioxane.

In some embodiments, the method involves reacting the difunctional monomer described in this disclosure with cyanuric chloride at a temperature of about 15° C. to about 45° C., such as about 20° C. to about 40° C., or about 25° C. to about 35° C. In some embodiments, the method involves reacting the difunctional monomer described in this disclosure with cyanuric chloride at a temperature of about 25° C. to about 35° C.

In some embodiments, the method involves reacting the difunctional monomer described in this cyanuric chloride for a first period of time at a first temperature and then for a second period of time at a second temperature. In some embodiments, the method involves reacting the difunctional monomer with cyanuric chloride for a first period of time at a first temperature of about 15° C. to about 45° C., such as about 20° C. to about 40° C., or about 25° C. to about 35° C., and then reacting the difunctional monomer with cyanuric chloride for a second period of time at a second temperature of about 60° C. to about 90° C., such as about 65° C. to about 85° C., or about 70° C. to about 80° C. In some embodiments, the method involves reacting the difunctional monomer with cyanuric chloride for a first period of time at a first temperature of about 25° C. to about 35° C., and then for a second period of time at a second temperature of about 70° C. to about 80° C.

In some embodiments, the method involves reacting the difunctional monomer described in this disclosure with cyanuric chloride for a total time of about 1 hour to about 36 hours, such as about 6 hours to about 30 hours, about 12 hours to about 24 hours, about 18 hours to about 24 hours, or about 1, about 2, about 3, about 4, about 5, about 6, about 9, about 12, about 15, about 18, about 21, about 22, about 23, about 24, about 27, about 30, about 33, or about 36 hours. In some embodiments, the method involves reacting the difunctional monomer with cyanuric chloride for a total time of about 18 hours to about 24 hours. In some embodiments the method involves reacting the difunctional monomer with cyanuric chloride for a total time of about 23 hours.

In some embodiments, the method involves reacting the difunctional monomer described in this disclosure with cyanuric chloride for a first period of time at a first temperature and then for a second period of time at a second temperature. In some embodiments, the method involves reacting the difunctional monomer with cyanuric chloride at a first temperature for a first period of time of about 1 hour to about 10 hours, such as about 3 hours to about 8 hours, about 4 hours to about 6 hours, or about 1 hour, about 2 hours, about 3 hours, about 4 hours, about 5 hours, about 6 hours, about 7 hours, about 8 hours, about 9 hours, or about 10 hours, and then reacting the difunctional monomer with cyanuric chloride at a second temperature for a second period of time of about 12 hours to about 24 hours, such as about 15 hours to about 21 hours, about 17 hours to about 19 hours, or about 12 hour, about 13 hours, about 14 hours, about 15 hours, about 16 hours, about 17 hours, about 18 hours, about 18 hours, about 20 hours, about 21 hours, about 22 hours, about 23 hours, or about 24 hours. In some embodiments, the method involves reacting the difunctional monomer with cyanuric chloride at a first temperature for a first period of time of about 5 hours, and then at a second temperature for a second period of time of about 18 hours.

In some embodiments, the method involves reacting the difunctional monomer with cyanuric chloride for a first period of time of about 5 hours at a first temperature of about 25° C. to about 35° C., and then for a second period of time of about 18 hours at a second temperature of about 70° C. to about 80° C.

Methods Using the Cement Compositions Containing Polymeric Additives

Also provided in this disclosure is a method for providing long-term zonal isolation in oil wells (that is, subterranean formations) including providing to an oil well a cement composition comprising cement and a triazine polymeric additive described in this disclosure. In some embodiments, the polymeric additive has a structure selected from structure A and structure B.

In some embodiments, the providing occurs above the surface. The providing can also occur in the subterranean formation.

The subterranean formation can contain a wellbore containing a steel casing or multiple casings, a cement sheath in the annuli, and optionally a packer and a production tubing. The cement sheath, can experience stresses and annular pressure buildup due to, for example, gas flow through microchannels in the annulus, forming microannuli, and fractures (for example, microfractures), cracks and clefts within or around the cement sheath, the casing, or the production tubing. This can result in a deterioration of the mechanical properties of the cement and lead to formation of micro-cracks and fractures, which affect the production and increase the cost of operation.

In some embodiments, the polymeric additive improves the tensile properties of the well cement. In some embodiments, the cement composition containing the polymeric additive is stable in downhole conditions. In some embodiments, the polymeric additive interacts with the cement and forms stable linkages between the additive and the cement. In some embodiments, this interaction at the molecular level allows for uniform distribution of the stresses experienced in the cement matrix, thus enhancing the properties of the cement.

Also provided in this disclosure is a method of preventing the formation of micro-cracks and fractures in the cement of an oil well (that is, subterranean formation). In some embodiments, the method includes providing to an oil well a cement composition comprising cement and a triazine polymeric additive described in this disclosure. In some embodiments, the polymeric additive has a structure selected from structure A and structure B.

EXAMPLES

Example 1—Synthesis and Characterization of Polymer Additives

Two series of polymeric additives (POLY A and POLY B) were synthesized by reacting cyanuric chloride with the cyclic aliphatic secondary amine piperazine. The general structures are shown in FIGS. 1A and 1B. The polymers in the POLY A series were linear, ladder-type polymers with chloride groups on the polymeric chain (FIG. 1A). The polymers in the POLY B series were non-linear, branched polymers without any chemically reactive groups (FIG. 1B).

Synthesis of POLY A Polymer Containing Piperazine:

The reaction steps for synthesis of a POLY A series polymer containing piperazine is shown in Scheme 2.

Scheme 2

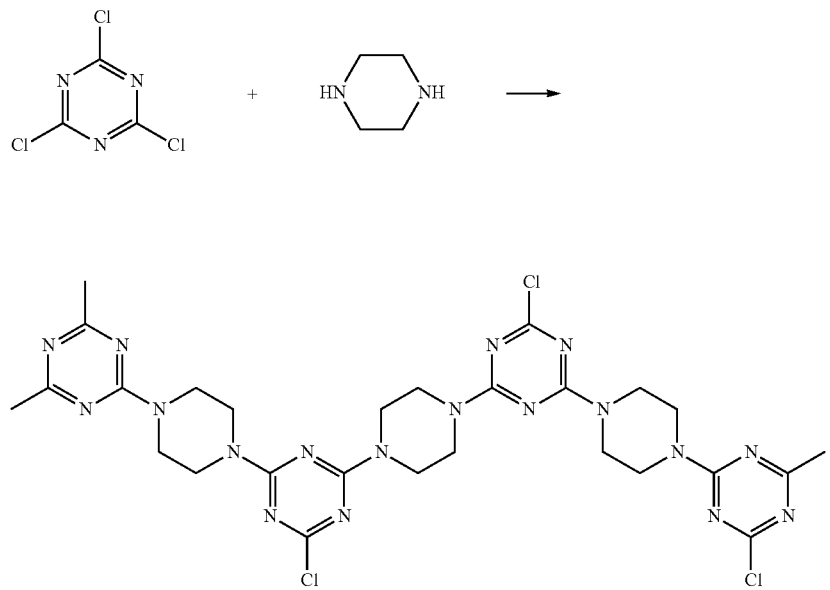

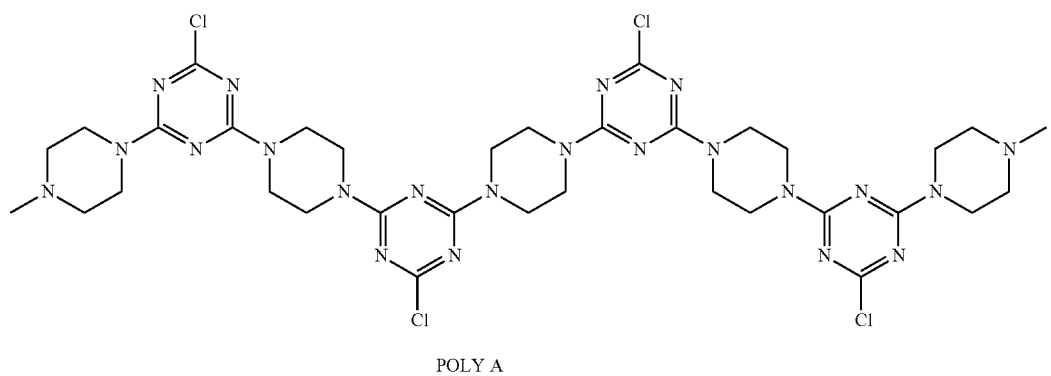

POLY A

In a reaction vessel, 4.7 grams (g) of piperazine and 20.7 milliliters (mL) of N,N-diisopropylethylamine were mixed in 150 mL 1,4-dioxane at 25-35° C. A solution of 10 g of cyanuric chloride in 50 mL 1,4-dioxane was added to the reaction vessel at 1 milliliter/minute (mL/min) with vigorous stirring. The reaction mixture was stirred at 25-35° C. for 23 hours. The precipitates formed were isolated by filtration and washed with de-ionized water two times and once with acetone. The precipitates were dried at 25-35° C. under vacuum overnight to result 11.2 g of POLY A in the form of fine powder. The molar ratio of cyanuric chloride to piperazine was 1:1 and polymers with pendant chloride groups were obtained.

Synthesis of POLY B Polymer Containing Piperazine:

The reaction steps for synthesis of a POLY B series polymer containing piperazine is shown in Scheme 3.

Scheme 3

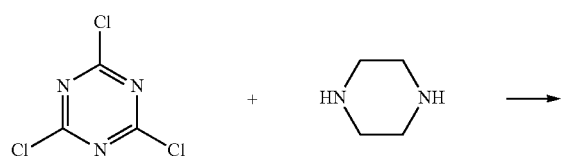

-continued

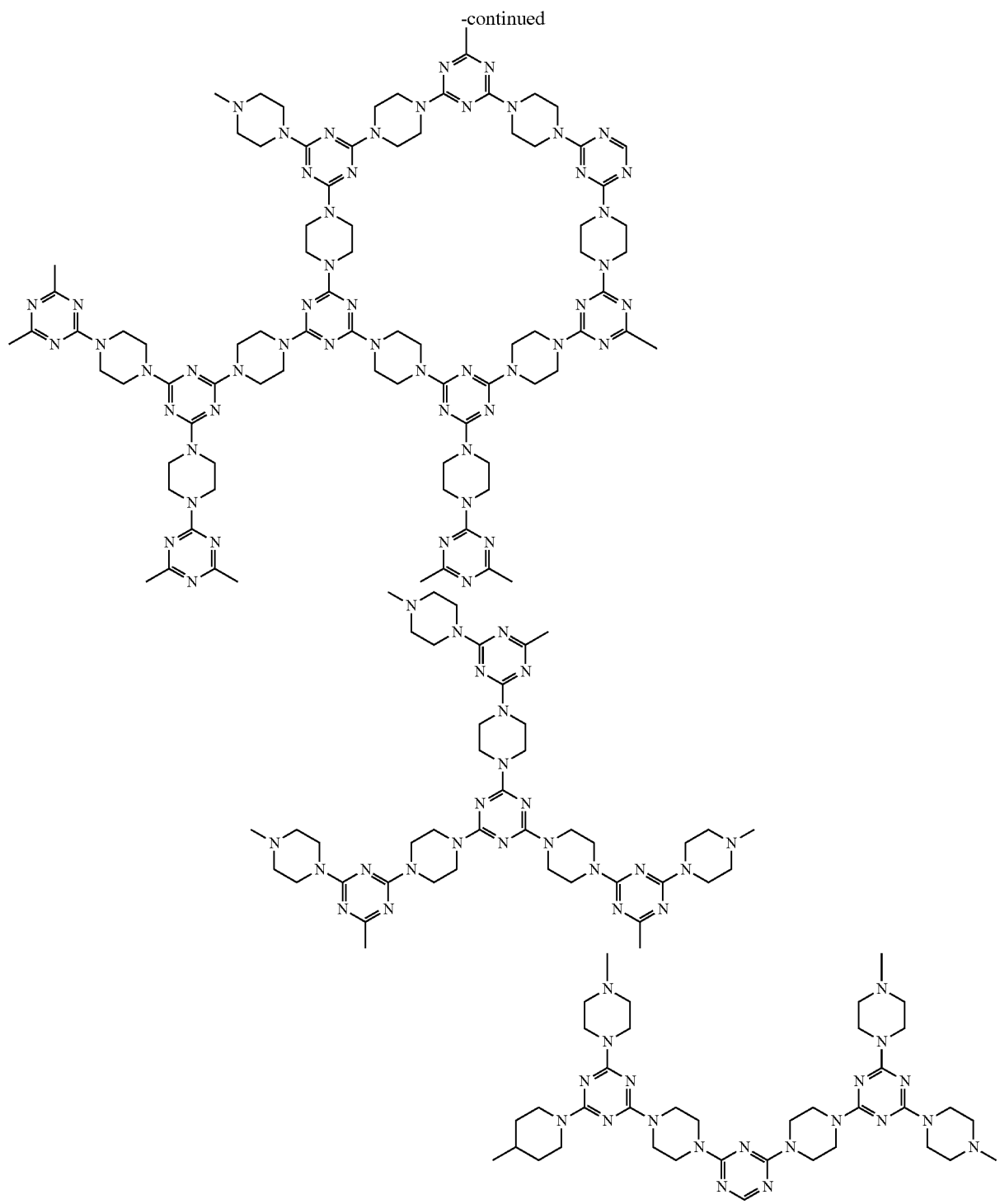

POLY B

In a reaction vessel, 7.0 g of piperazine and 33 mL of N,N-diisopropylethylamine were mixed in 150 mL 1,4-dioxane at 25-35° C. A solution of 10 g of cyanuric chloride in 50 mL 1,4-dioxane was added to the reaction vessel at 1 mL/min with vigorous stirring. The reaction mixture was stirred at 25-35° C. for 5 hours, followed by heating at 70-80° C. for 18 hours. The precipitates formed were isolated by filtration and washed with de-ionized water two times and once with acetone. The precipitates were dried at 80° C. under vacuum overnight to result in 11.2 g of POLY B in the form of fine powder. The molar ratio of cyanuric chloride to piperazine was 1:1.5 and polymers without any pendant chloride groups were obtained.

Characterization of POLY A and POLY B Polymers

FT-IR Spectroscopy

The formation of the POLY A and POLY B series polymers containing piperazine was confirmed by FT-IR spectroscopy (see FIG. 2). The FT-IR spectra showed bands in the 1225-1620 centimeters$^{-1}$ (cm$^{-1}$) region, corresponding to stretching modes of CN heterocycles, and a band at 805 cm$^{-1}$, corresponding to the breathing mode of the triazine units. The FT-IR for the POLY A series polymer demonstrated a shoulder peak at 852 cm$^{-1}$ that confirmed the pendant chloride groups in the polymer networks. The POLY B series polymer lacked the characteristic C—Cl stretching vibration at 852 cm$^{-1}$, suggesting that all chloride groups were substituted.

Thermogravimetric Analysis

The thermal stability of both the POLY A and POLY B series polymers was 380° C., as obtained from the thermogravimetric analyses of the samples (see FIGS. 3A-3B). One distinct characteristic of mass loss in POLY A (FIG. 3A) at around 100° C. can be attributed to the evolution of chloride at around 100° C. The removal of chloride can be obtained at even lower temperatures under basic conditions.

Example 2—Cement Slurry Preparation

A series of cement slurries (Formulations A-C) was prepared from the POLY A and POLY B polymers described in Example 1. The procedure used to prepare each formulation is as follows and the components are shown in Table 1.

Formulation A

Class G cement was blended with a suspending agent (FSA-3, Fritz Industries, Mesquite, Tex.) to provide viscosity and keep cement particles suspended during the curing process. The blended cement mixture was added into water at 8000 revolutions per minute (rpm), followed by mixing at 12000 rpm for 35 seconds (sec). The cement slurry was poured into a 1-inch diameter cylinder and was cured at 180° F. and 3000 psi for 48 hours (h). The cement samples of 1-inch diameter/2-inch length were used for mechanical testing.

Formulation B

Class G cement was blended with a suspending agent (FSA-3, Fritz Industries, Mesquite, Tex.) and the POLY B polymer of Example 1. The blended cement mixture was added into water at 8000 rpm, followed by mixing at 12000 rpm for 35 sec. The cement slurry was poured into a 1-inch diameter cylinder and was cured at 180° F. and 3000 psi for 48 h. The cement samples of 1-inch diameter/2-inch length were used for mechanical testing.

Formulation C

Class G cement was blended with a suspending agent (FSA-3, Fritz Industries, Mesquite, Tex.) and the POLY A polymer of Example 1. The blended cement mixture was added into water at 8000 rpm, followed by mixing at 12000 rpm for 35 sec. The cement slurry was poured into a 1-inch diameter cylinder and was cured at 180° F. and 3000 psi for 48 h. The cement samples of 1-inch diameter/2-inch length were used for mechanical testing.

TABLE 1

| Cement formulations | | | |
|---|---|---|---|
| Formulation | Components | Amount/g | % by wt. of cement |
| Formulation A | Class G cement | 205.8 | |
| | Suspending agent | 0.82 | 0.4 |
| | Water | 136.2 | |
| Formulation B | Class G cement | 205.8 | |
| | Suspending agent | 0.82 | 0.4 |
| | POLY B | 6.2 | 3 |
| | Water | 136.2 | |
| Formulation C | Class G cement | 205.8 | |
| | Suspending agent | 0.82 | 0.4 |
| | POLY A | 6.2 | 3 |
| | Water | 136.2 | |

Example 3—Mechanical Testing of Cement Formulations

Compressive Strength

The compressive strengths of the cement formulations described in Example 2 were tested under confined pressure of 20 MPa at 80° F. and 180° F. (See Table 2 and FIG. 4) using a triaxial press capable of generating confining pressures of up to 75 MPa (10,900 psi). The test equipment consisted of an axial loading system, a confining pressure supply system, and data acquisition software. The cylindrical cement samples were jacketed and placed between steel end-caps. Static mechanical properties were measured using strain gauge sensors, which were mounted on the sample to measure axial deformation and radial deformation. A series of laboratory tests was performed to examine the fatigue behavior of cement when subjected to cyclic loading under triaxial compression conditions. After the sample was placed in a triaxial cell, a confining pressure was applied. The cyclic axial load was applied in the form of triangular waveforms. Each sample was deformed over three cyclic loading series. In each cyclic loading series, a differential stress of 10 MPa was applied during the cyclic loading; various peak axial stresses were applied during cyclic loading. Because uniaxial stress was applied to the sample, this module was used to calculate Young's modulus and Poisson's ratio to measure sample strain.

Formulation A, the cement without any polymer additive, showed compressive strengths of 2520 psi and 5990 psi at 80° F. and 180° F., respectively. Formulation B, the cement with the POLY B additive, showed compressive strengths of 3626 psi and 6100 psi at 80° F. and 180° F., respectively, and Formulation C, the cement with the POLY A additive, showed compressive strengths of 3762 psi and 6163 psi at 80° F. and 180° F., respectively. These results showed that the compressive strengths of Formulations B and C were not affected by incorporating the polymeric additives. Without wishing to be bound by any theory, it is believed that the interaction of the additives that contain functional groups such as —Cl or nitrogen interact with cement particles, thereby changing the hydration characteristic of the cement and resulting in Formulations B and C providing greater compressive strength at the lower temperature (80° F.) tested. At the higher temperature tested (180° F.), the hydration gets saturated for neat cement and cement with additives; therefore, a difference in compressive strength may not be observed.

TABLE 2

Compressive strength of cement formulations at 20 MPa

| Formulation | Compressive strength at 80° F. | Compressive strength at 180° F. |
| --- | --- | --- |
| Formulation A | 2520 psi | 5990 psi |
| Formulation B | 3626 psi | 6100 psi |
| Formulation C | 3762 psi | 6163 psi |

Characterization of Formulation C

Figure 5:
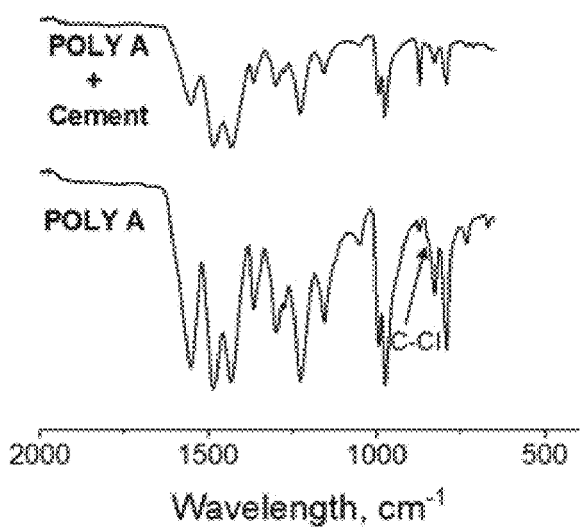
FIG. 5 shows the FT-IR spectra of POLY A and Formulation C (POLY A blended with cement).

To confirm the formation of chemical linkages between POLY A and the cement particles, FT-IR spectroscopic analysis of Formulation C was conducted as shown in FIG. 5. The shoulder peak at 852 cm$^{-1}$ that corresponds to C—Cl in the POLY A additive alone vanished after blending with the cement, which confirmed the formation of chemical bonding between the polymer and cement particles. This chemical linkage was formed from the interaction of hydroxyl groups in the cement particles with the C—Cl group of POLY A. The pH of the cement slurry provided the basic reaction medium to liberate hydrochloric acid and the curing temperature provided the right condition for the formation of linkages between the polymer and cement particles. The liberated hydrochloric acid can convert into sodium chloride or calcium chloride upon reaction with cement constituents.

Elastic Characterization

Figure 6:
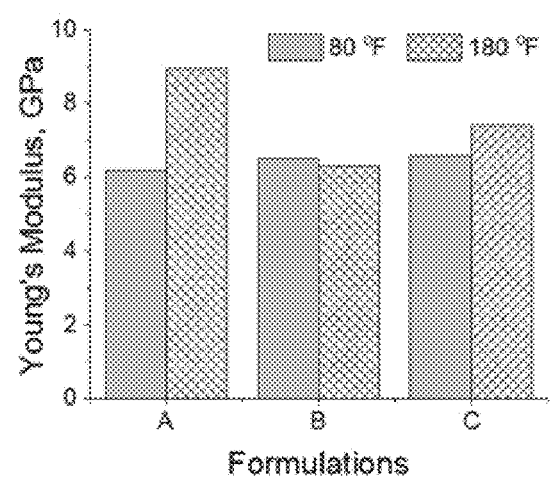
FIG. 6 is a graph showing the Young's modulus of cement formulations A-C under confined pressure of 20 MPa at 80° F. and 180° F.

The elastic characteristic of cement can be determined from Young's modulus, a mechanical property that measures the stiffness of a solid material and defines the relationship between stress (force per unit area) and strain (proportional deformation) in a material in the linear elasticity regime of a uniaxial deformation. The Young's modulus of cement Formulations A-C is shown in Table 3 and FIG. 6. Formulation A, the cement without any polymer additive, showed a Young's modulus of 6.2 GPa and 8.9 GPa at 80° F. and 180° F., respectively. Formulation B, the cement with POLY B, demonstrated a Young's modulus of 6.5 GPa and 6.3 GPa at 80° F. and 180° F., respectively, and Formulation C, the cement with POLY A, demonstrated a Young's modulus of 6.6 GPa and 7.4 GPa at 80° F. and 180° F., respectively. The reduction in the Young's modulus for Formulations B and C, as compared to Formulation A, showed that the elastic properties of the cement were improved at the higher temperature tested (180° F.) as compared to the lower temperature tested (80° F.) upon addition of POLY A and POLY B.

TABLE 3

Young's modulus of cement formulations at 20 MPa

| Formulation | Young's modulus at 80° F. | Young's modulus at 180° F. |
| --- | --- | --- |
| Formulation A | 6.2 GPa | 8.9 GPa |
| Formulation B | 6.5 GPa | 6.3 GPa |
| Formulation C | 6.6 GPa | 7.4 GPa |

What is claimed is:

1. A method for preventing the formation of micro-cracks and fractures in the cement of an oil well, thereby providing long-term zonal isolation in the well, the method comprising providing to the oil well a cement composition comprising cement and a triazine polymeric additive having repeat units selected from structure A and structure B:

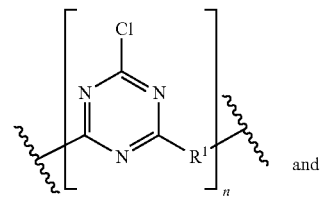

A

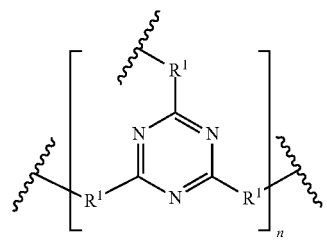

B wherein R$^1$ is selected from the group consisting of a cyclic aliphatic secondary amine, an aromatic diamine, an aromatic diol, an aliphatic diamine, and an aliphatic diol; and n is about 10 to about 1000;

wherein the cement composition exhibits improved elastic properties as compared to the same composition without the polymeric additive.

2. The method of claim 1, wherein R$^1$ is selected from the group consisting of:

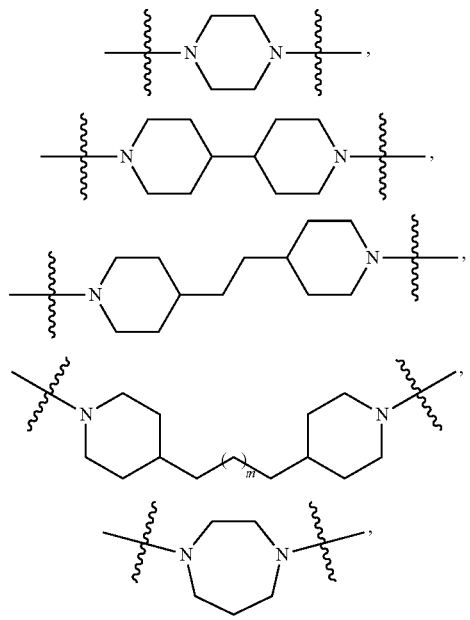

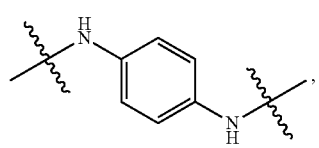

-continued

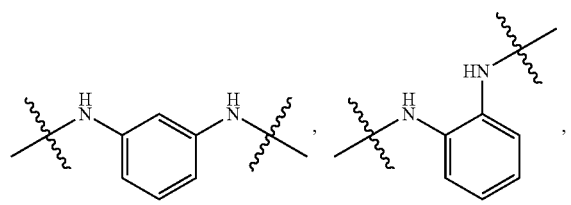

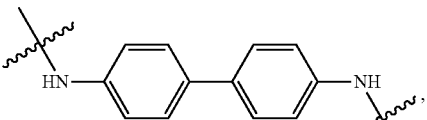

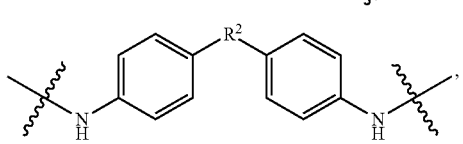

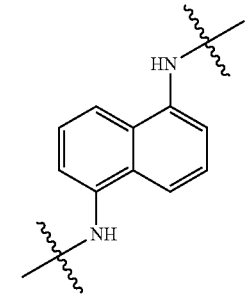

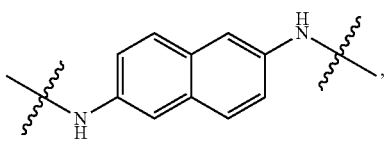

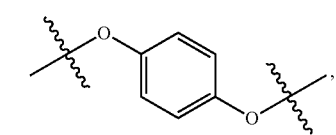

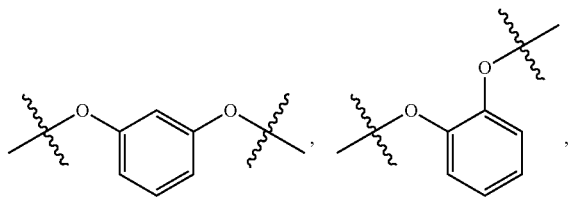

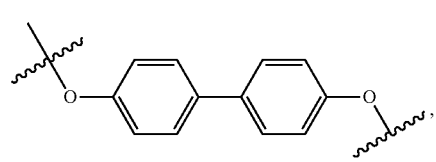

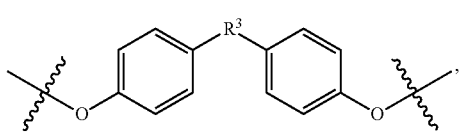

-continued

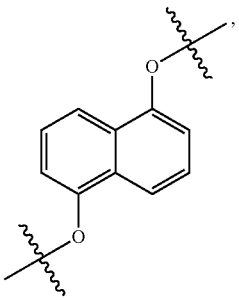

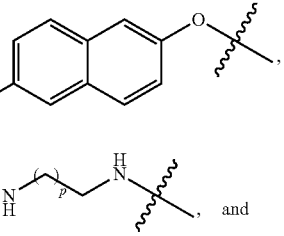

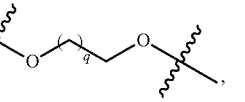, and

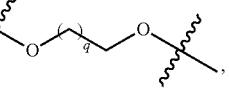, wherein:

$R^2$ and $R^3$ are each independently selected from the group consisting of $C_1$-$C_6$ alkyl, C(=O), $SO_2$, and O;

m is 0 to 6;

p is 0 to 8; and q is 0 to 8.

3. The method of claim 2, wherein $R^1$ is

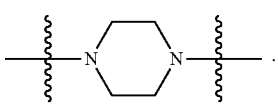.

4. The method of claim 3, wherein the polymeric additive is a polymer having repeat units of structure A and has the structure:

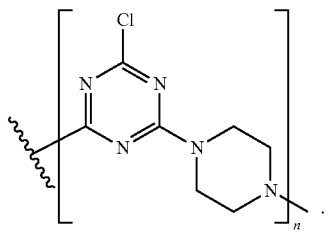.

5. The method of claim 3, wherein the polymeric additive is a polymer having repeat units of structure B and has the structure:

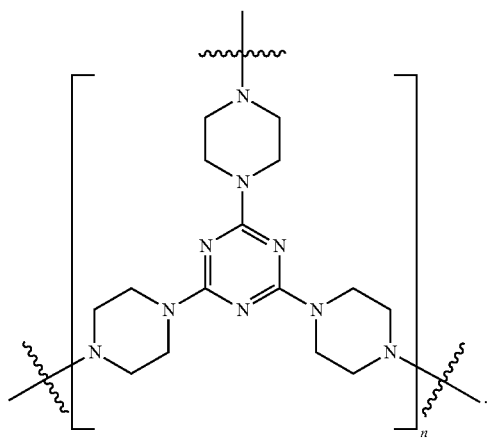

6. The method of claim 1, wherein the amount of polymeric additive in the cement composition is between about 0.1% to about 10% by weight of the cement.

7. The method of claim 6, wherein the amount of polymeric additive in the cement composition is about 3% by weight of the cement.

8. The method of claim 1, wherein the cement composition further comprises one or more of a suspending agent, a neutralizing agent, and a reaction propagating agent.

9. The method of claim 8, wherein the one or more suspending agent, neutralizing agent, and reaction propagating agent are selected from the group consisting of N,N-diisopropylethylamine, triethylamine, trimethylamine, sodium hydroxide, potassium hydroxide, sodium carbonate, and potassium carbonate.

10. The method of claim 1, wherein the cement composition further comprises water.

11. The method of claim 1, wherein the cement composition has a Young's modulus of about 0.1 GPa to about 40 GPa, about 3 GPa to about 25 GPa, or about 5 GPa to about 20 GPa at a pressure of about 0.1 MPa to about 150 MPa, about 10 MPa to about 100 MPa, or about 20 MPa to about 40 MPa, at a temperature of about 77° F. to about 450° F., about 125° F. to about 350° F., or about 150° F. to about 200° F.

12. The method of claim 11, wherein the cement composition has a Young's modulus of about 5 GPa to about 10 GPa at a pressure of about 20 MPa and a temperature of about 180° F.

13. The method of claim 1, wherein the cement composition has a compressive strength of about 1000 psi to about 10,000 psi, about 2000 psi to about 8000 psi, or about 3500 psi to about 6500 psi, at a pressure of about 0.1 MPa to about 150 MPa, about 10 MPa to about 100 MPa, or about 20 MPa to about 40 MPa, at a temperature of about 77° F. to about 450° F., about 125° F. to about 350° F., or about 150° F. to about 200° F.

14. The method of claim 13, wherein the cement composition has a compressive strength of about 5500 psi to about 6500 psi at a pressure of about 20 MPa and a temperature of about 180° F.

15. The method of claim 1, wherein addition of the polymeric additive to the cement does not decrease the compressive strength of the cement by more than about 200 psi to about 1000 psi as compared to the compressive strength of the same cement without addition of the polymeric additive.

16. A method of preparing a cement composition, comprising:
a) reacting a difunctional monomer with cyanuric chloride to form a triazine polymeric additive; and
b) mixing the triazine polymeric additive with cement.

17. The method of claim 16, wherein the difunctional monomer is selected from the group consisting of a cyclic aliphatic secondary amine, an aromatic diamine, an aromatic diol, an aliphatic diamine, and an aliphatic diol.

18. The method of claim 17, wherein the difunctional monomer is selected from the group consisting of:

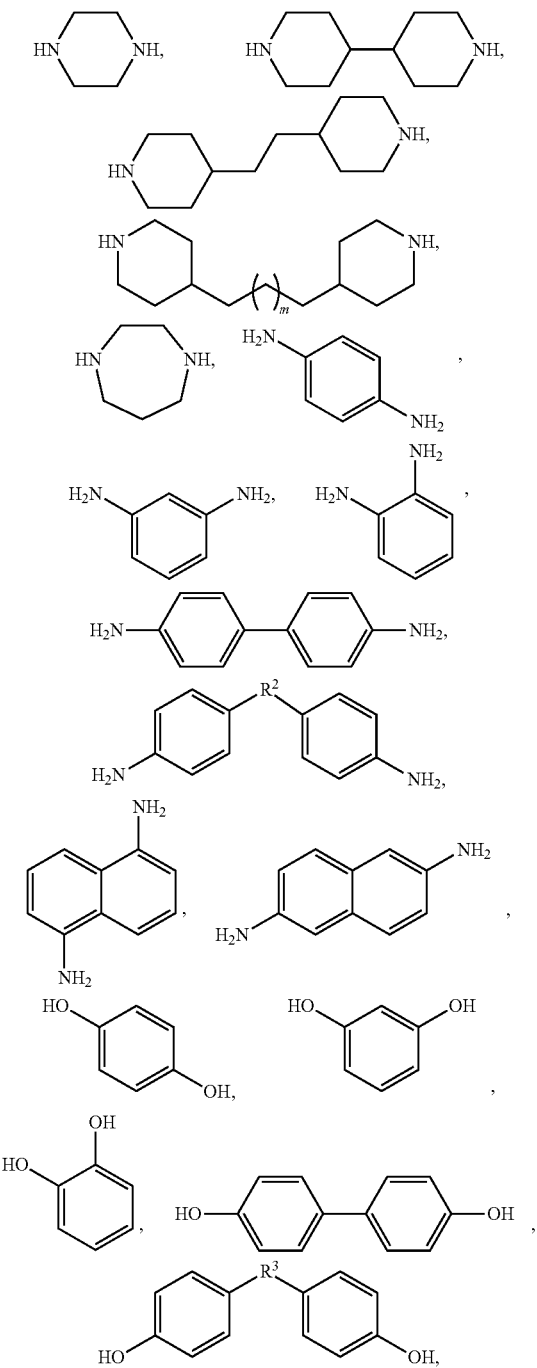

-continued

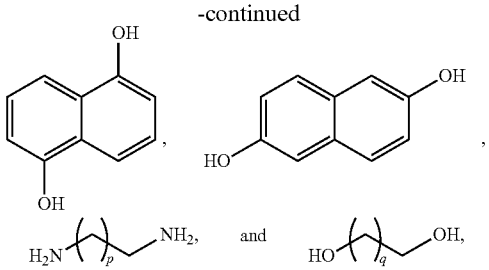

wherein:
R² and R³ are each independently selected from the group consisting of $C_1$-$C_6$ alkyl, C(=O), $SO_2$, and O;
m is 0 to 6;
p is 0 to 8; and
q is 0 to 8.

19. The method of claim 18, wherein the difunctional monomer is

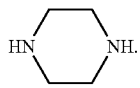

20. The method of claim 16, wherein the molar ratio of the cyanuric chloride to the difunctional monomer is about 1:1 to about 1:2.

21. The method of claim 20, wherein the molar ratio of the cyanuric chloride to the difunctional monomer is about 1:1.

22. The method of claim 21, wherein the triazine polymeric additive has the structure:

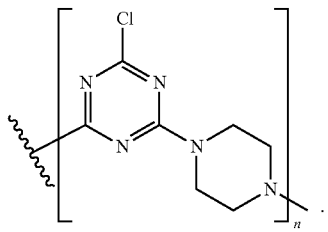

wherein n is about 10 to about 1000.

23. The method of claim 20, wherein the molar ratio of the cyanuric chloride to the difunctional monomer is about 1:1.5.

24. The method of claim 23, wherein the triazine polymeric additive has the structure:

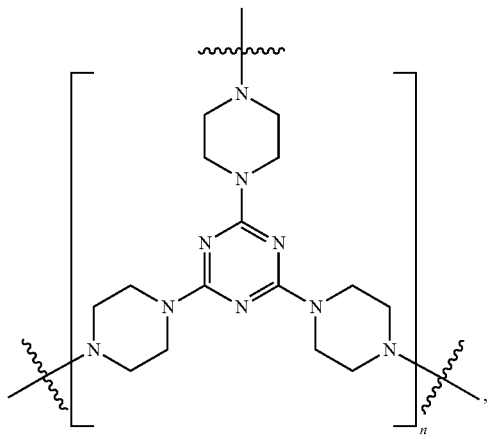

wherein n is about 10 to about 1000.

25. The method of claim 16, wherein the amount of polymeric additive in the cement composition is about 0.1% to about 10% by weight of the cement.

26. The method of claim 25, wherein the amount of polymeric additive in the cement composition is about 3% by weight of the cement.

27. The method of claim 16, wherein the cement composition further comprises one or more of a suspending agent, a neutralizing agent, and a reaction propagating agent.

28. The method of claim 27, wherein the one or more suspending agent, neutralizing agent, and reaction propagating agent are selected from the group consisting of N,N-diisopropylethylamine, triethylamine, trimethylamine, sodium hydroxide, potassium hydroxide, sodium carbonate, and potassium carbonate.

29. The method of claim 16, wherein the cement composition further comprises water.

* * * * *